US008848157B2

(12) United States Patent
Oiwa et al.

(10) Patent No.: US 8,848,157 B2
(45) Date of Patent: Sep. 30, 2014

(54) LIQUID CRYSTAL DISPLAY

(75) Inventors: Mika Oiwa, Chiba (JP); Shintaro Takeda, Hitachi (JP); Kotaro Araya, Hitachiota (JP); Yasushi Tomioka, Hitachinaka (JP); Yoshiro Mikami, Hitachiota (JP)

(73) Assignees: Japan Display Inc., Tokyo (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 317 days.

(21) Appl. No.: 12/805,820

(22) Filed: Aug. 20, 2010

(65) Prior Publication Data

US 2011/0075073 A1 Mar. 31, 2011

(30) Foreign Application Priority Data

Sep. 25, 2009 (JP) ................................ 2009-220220
Mar. 23, 2010 (JP) ................................ 2010-067091

(51) Int. Cl.
  *C09K 19/02* (2006.01)
  *G02F 1/1343* (2006.01)
(52) U.S. Cl.
  USPC .......................................... 349/179; 349/141
(58) Field of Classification Search
  CPC ..................................................... C09K 19/586
  USPC ................................................. 349/179–181
  See application file for complete search history.

(56) References Cited

U.S. PATENT DOCUMENTS

| 8,199,086 B2* | 6/2012 | Doane et al. ..................... 345/87 |
| 2003/0054119 A1 | 3/2003 | Norisue et al. |
| 2004/0089843 A1* | 5/2004 | Suermann et al. .......... 252/299.7 |
| 2004/0173775 A1 | 9/2004 | Suermann et al. |
| 2005/0168663 A1 | 8/2005 | Miyachi et al. |
| 2005/0185131 A1 | 8/2005 | Miyachi et al. |
| 2006/0027784 A1* | 2/2006 | Francis et al. ........... 252/299.63 |
| 2006/0050354 A1* | 3/2006 | Heckmeier et al. ........... 359/245 |
| 2007/0243342 A1* | 10/2007 | Shukla et al. .................. 428/1.3 |
| 2008/0180630 A1 | 7/2008 | Clarke |

(Continued)

FOREIGN PATENT DOCUMENTS

| CN | 1381438 | 11/2002 |
| CN | 1516730 | 7/2004 |

(Continued)

OTHER PUBLICATIONS

JP Office Action of Appln. No. 2010-067091 dated Feb. 26, 2013 with partial English translation.

(Continued)

*Primary Examiner* — Dennis Y Kim
(74) *Attorney, Agent, or Firm* — Antonelli, Terry, Stout & Kraus, LLP.

(57) ABSTRACT

A liquid crystal display includes: a pair of substrates including at least one transparent substrate; a liquid crystal layer disposed between the pair of substrates; and an electrode group formed on at least one of the pair of substrates so as to apply an electric field to the liquid crystal layer. The liquid crystal layer contains at least one kind of liquid crystalline compound and at least one kind of chiral dopant. The concentration c of the chiral dopant is lower than a saturation solubility s thereof. The concentration c of the chiral dopant and a helical twisting power [HTP] of the chiral dopant satisfy a relation of $[HTP] \cdot c \geq 5.5$ ($\mu m^{-1}$).

14 Claims, 14 Drawing Sheets

(56) References Cited

U.S. PATENT DOCUMENTS

| | | |
|---|---|---|
| 2008/0259254 A1 | 10/2008 | Kikuchi et al. |
| 2009/0059156 A1 | 3/2009 | Utsumi et al. |
| 2009/0153761 A1 | 6/2009 | Park et al. |
| 2009/0219466 A1 | 9/2009 | Kagawa et al. |
| 2009/0267025 A1* | 10/2009 | Schott et al. ............... 252/299.2 |
| 2009/0322997 A1 | 12/2009 | Kaihoko et al. |
| 2010/0103337 A1* | 4/2010 | Takaku .......................... 349/33 |

FOREIGN PATENT DOCUMENTS

| | | |
|---|---|---|
| JP | 2005-202390 | 7/2005 |
| JP | 2006-003840 A | 1/2006 |
| JP | 2006-089622 | 4/2006 |
| JP | 2006-99039 A | 4/2006 |
| JP | 2006-348227 | 12/2006 |
| JP | 2008-266633 | 11/2008 |
| JP | 2009-58697 | 3/2009 |
| JP | 2009-145865 | 7/2009 |
| JP | 2009-210695 | 9/2009 |
| JP | 2009-237554 | 10/2009 |
| JP | 2009-237584 | 10/2009 |
| JP | 2010-26200 | 2/2010 |
| JP | 2010-33041 | 2/2010 |
| WO | WO 2005/090520 A1 | 9/2005 |

OTHER PUBLICATIONS

Office Action issued on Nov. 19, 2013 in connection Japanese Patent Application No. 2010-067091.

* cited by examiner

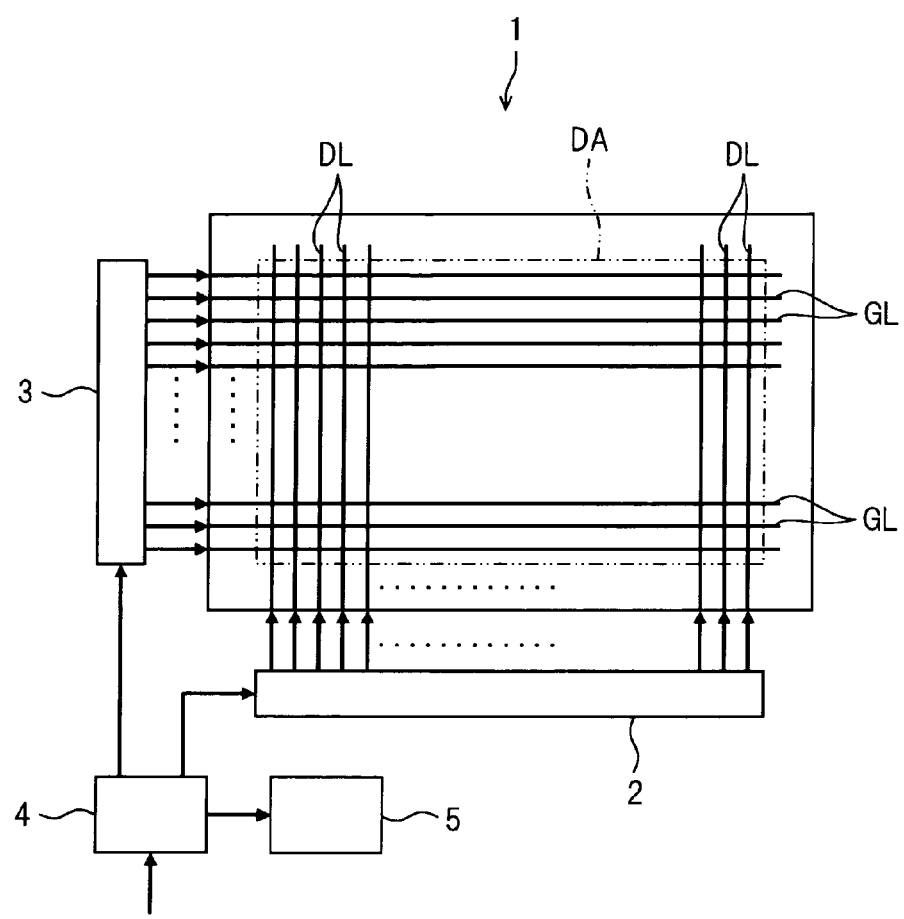

LIQUID CRYSTAL DISPLAY

CROSS-REFERENCE TO RELATED APPLICATIONS

The present application claims priority from Japanese applications JP2009-220220 filed on Sep. 25, 2009 and JP2010-067091 filed on Mar. 23, 2010 the contents of which are hereby incorporated by reference into this application.

BACKGROUND OF THE INVENTION

1. Field of the Invention

The present invention relates to a liquid crystal display.

2. Description of the Related Art

A low contrast ratio is one problem of an in-plane switching (IPS) LCD that uses the nematic phase. The reasons for this are considered to be associated with an increase in the transmittance during black presentation. This is because nematic liquid crystals having a uniaxial anisotropy fluctuate with heat, thus producing regions in which the alignment directions thereof are different. Thus, the refractive indices change from place to place and from time to time, and light scattering occurs. Therefore, the use of optically isotropic liquid crystals which are liquid crystal phase without any anisotropy is being considered.

As a liquid crystal display device which does not require a surface alignment treatment nor cause alight leakage during black presentation (instead providing a dark visual field) and remarkably improves the response speed during video presentation, a liquid crystal display device which is formed from polymer-stabilized blue-phase liquid crystals interposed between a pair of transparent substrates is known. The liquid crystal display device that uses the polymer-stabilized blue-phase liquid crystals exhibits a large birefringence change in response to application of an in-plane electric field to a cell substrate. The polymer-stabilized blue-phase liquid crystals are made up of low-molecular liquid crystals capable of exhibiting a blue phase between the cholesteric phase and the isotropic phase and a polymer network formed in the low-molecular liquid crystals. In addition, a liquid crystal display device in which the kinds and amounts of chiral dopants added to liquid crystals are optimized so as to prevent the occurrence of the light leakage during black presentation (instead providing a dark visual field) is proposed in WO2005/090520.

In addition, JP-A-2008-266633 discloses a polymer/liquid crystal composite material, which is capable of exhibiting high durability and reliability in regards to the light leakage caused by repeated driving of a liquid crystal display device or the like having an optical isotropy when no electric field is applied and achieving a low driving voltage, and which has excellent phase stability with a low polymer content, and a polymer-stabilized blue-phase liquid crystal display device using such a material. The polymer/liquid crystal composite material is obtained by dispersing a polymer unit of a specific polyfunctional compound and a polymer unit of a monofunctional compound in a liquid crystal material having no polymerizable group and polymerizing the dispersion in an optically isotropic phase state. In the obtained polymer/liquid crystal composite material, at least a part of one of the polymer units originates from a methacrylate skeleton-containing compound, at least a part of the other polymer unit originates from a acrylate skeleton-containing compound, and the content of the polymer unit originating from the methacrylate skeleton-containing compound is 1 to 99 mass % with regards to the total weight of a copolymer of the polymer units. The polymer/liquid crystal composite material consists of 1 to 40 mass % of the copolymer and 99 to 60 mass % of the liquid crystal material exhibiting a chiral nematic phase or a blue phase at room temperature.

SUMMARY OF THE INVENTION

The present invention aims to improve the contrast ratio of a liquid crystal display.

In order to solve the problems, this application discloses various inventions, and representative inventions among them can be summarized as follows.

(1) A liquid crystal display including:

a pair of substrates including at least one transparent substrate;

a liquid crystal layer disposed between the pair of substrates; and an electrode group formed on at least one of the pair of substrates so as to apply an electric field to the liquid crystal layer, wherein the liquid crystal layer contains at least one kind of liquid crystalline compound and at least one kind of chiral dopant, wherein a concentration c of the chiral dopant is lower than a saturation solubility s thereof, and wherein the concentration c of the chiral dopant and a helical twisting power [HTP] of the chiral dopant satisfy a relation of $[HTP] \cdot c \geq 5.5$ ($\mu m^{-1}$).

(2) The liquid crystal display according to (1), wherein the concentration c of the chiral dopant and the helical twisting power [HTP] of the chiral dopant satisfy a relation of $[HTP] \cdot c \geq 6.0$ ($\mu m^{-1}$).

(3) The liquid crystal display according to (1), wherein a contrast ratio is 2000 or higher, and wherein when the liquid crystal layer has a Bragg diffraction wavelength, the longest wavelength of the Bragg diffraction wavelength is 380 nm or less.

(4) The liquid crystal display according to (1), wherein a contrast ratio is 2000 or higher, and wherein when the liquid crystal layer has a Bragg diffraction wavelength, the longest wavelength of the Bragg diffraction wavelength is 345 nm or less.

(5) The liquid crystal display according to any one of (1) to (4), wherein the liquid crystal layer contains a polymerizable monomer, and wherein the liquid crystal layer has such a content ratio that a molar fraction of the polymerizable monomer is smaller than that of the liquid crystalline compound.

(6) The liquid crystal display according to any one of (1) to (5), wherein the chiral dopant is any one of a binaphthyl derivative, an abietic acid derivative, and an isosorbide derivative.

(7) The liquid crystal display according to (1), wherein a chiral pitch of the chiral nematic phase of the liquid crystal layer is 180 nm or smaller.

(8) The liquid crystal display according to (1), wherein a chiral pitch of the chiral nematic phase of the liquid crystal layer is 160 nm or smaller.

(9) A liquid crystal display including:

a pair of substrates including at least one transparent substrate;

a liquid crystal layer disposed between the pair of substrates; and an electrode group formed on at least one of the pair of substrates so as to apply an electric field to the liquid crystal layer, wherein the liquid crystal layer contains at least one kind of liquid crystalline compound, at least one kind of chiral dopant, and a polymerizable monomer, wherein a transmittance during black presentation of the liquid crystal layer under a crossed Nicol state is 0.05% or lower in a wavelength region of 400 nm or higher and 750 nm or lower.

(10) The liquid crystal display according to (9), wherein a difference between the maximum and minimum of the transmittance during black presentation is 0.03% or lower in the wavelength region of 400 nm or higher and 750 nm or lower.

(11) The liquid crystal display according to any one of (9) and (10), wherein the liquid crystal layer has such a content ratio that a molar fraction of the polymerizable monomer is smaller than that of the liquid crystalline compound.

(12) A liquid crystal display including:

a pair of substrates including at least one transparent substrate;

a liquid crystal layer disposed between the pair of substrates; and an electrode group formed on at least one of the pair of substrates so as to apply an electric field to the liquid crystal layer, wherein the liquid crystal layer contains at least one kind of liquid crystalline compound and n kinds (n is a natural number of 2 or more) of chiral dopants, wherein a concentration c of the n kinds of chiral dopants is lower than a saturation solubility s of the n kinds of chiral dopants, and wherein the concentration c of the n kinds of chiral dopants and a helical twisting power [HTP] of the n kinds of chiral dopants satisfy a relation of $[HTP] \cdot c \geq 5.5$ ($\mu m^{-1}$).

(13) The liquid crystal display according to (12), wherein the concentration c of the n kinds of chiral dopants and the helical twisting power [HTP] of the n kinds of chiral dopants satisfy a relation of $[HTP] \cdot c \geq 6.0$ ($\mu m^{-1}$).

(14) The liquid crystal display according to any one of (12) and (13), wherein a concentration $c_i$ (i is a natural number of 1 to n) of each of the n kinds of chiral dopants is lower than a saturation solubility $s_i$ of each of the n kinds of chiral dopants.

(15) The liquid crystal display according to any one of (12) to (14), wherein a concentration $c_i$ (i is a natural number of 1 to n) of one or plural kinds of chiral dopants among the n kinds of chiral dopants and a helical twisting power $[HTP]_i$ of each of the one or plural kinds of chiral dopants satisfy a relation of $[HTP]_i \cdot c_i < 5.5$ ($\mu m^{-1}$).

(16) The liquid crystal display according to any one of (12) to (15), wherein the n kinds of chiral dopants contain 2 kinds of chiral dopants of which the twisted directions are the same.

(17) The liquid crystal display according to any one of (12) to (16), wherein a transmittance during black presentation of the liquid crystal layer under a crossed Nicol state is 0.05% or lower in a wavelength region of 400 nm or higher and 750 nm or lower.

(18) The liquid crystal display according to any one of (12) to (16), wherein a transmittance during black presentation of the liquid crystal layer under a crossed Nicol state is 0.03% or lower in a wavelength region of 400 nm or higher and 750 nm or lower.

According to the present invention, the contrast ratio of a liquid crystal display can be improved. These and other objects, configurations, and advantages of the present invention will become apparent from the description of the embodiments below.

BRIEF DESCRIPTION OF THE DRAWINGS

FIG. 1A is a schematic block diagram showing an example of a simplified configuration of a liquid crystal display according to the present invention.

DETAILED DESCRIPTION OF THE INVENTION

Figure 1B:
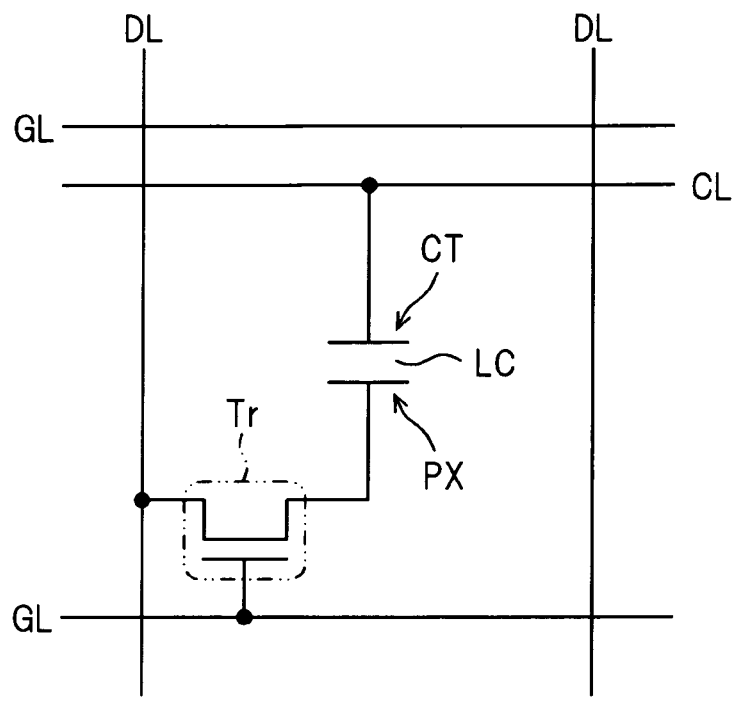
FIG. 1B is a schematic circuit diagram showing an example of a circuit configuration of one pixel of a liquid crystal display panel.

First, embodiments of the present invention will be described with reference to the accompanying drawings. However, it should be noted that various changes and modifications can be made to the embodiments of the present invention without departing from the technical ideas of the present invention.

Throughout the entire figures illustrating the embodiments, constituent elements having the same function will be denoted by the same reference numerals, and redundant description thereof will be omitted.

A liquid crystal display according to the present embodiment is an active matrix-type liquid crystal display, for example, having a plurality of switching elements, which includes a pair of substrates including at least one transparent substrate, a liquid crystal layer LC disposed between the pair of substrates, an electrode structure formed on one of the pair of substrates so as to generate an electric field having a dominant component parallel to the plane of the substrate in the liquid crystal layer, a pair of alignment regulating films formed on respective surfaces of the pair of substrates contacting the liquid crystal layer, and a pair of polarizers disposed so as to interpose the pair of substrates.

FIGS. 1A to 1D are schematic diagrams showing a simplified configuration of a liquid crystal display according to an embodiment of the present invention.

Figure 1C:
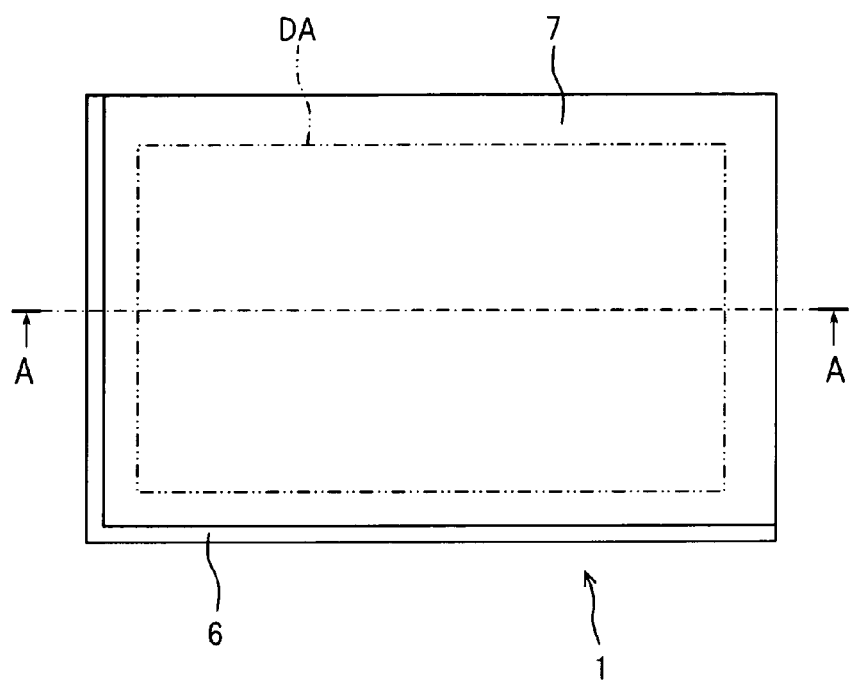
FIG. 1C is a schematic plan view showing an example of a simplified configuration of the liquid crystal display panel.
Figure 1D:
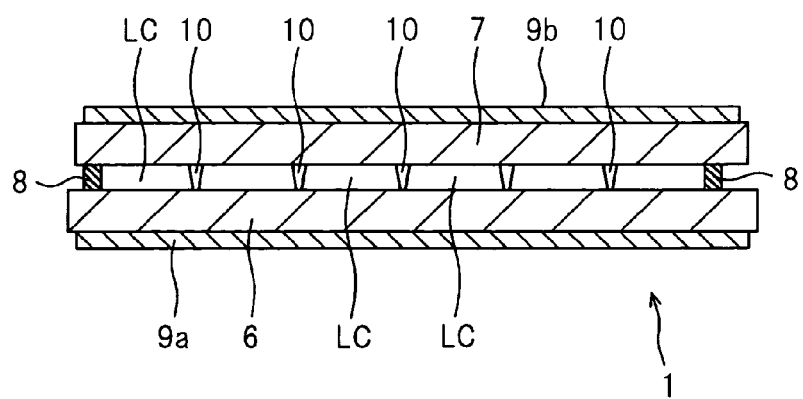
FIG. 1D is a schematic sectional view showing an example of a sectional structure along the line A-A in FIG. 1C.

FIG. 1A is a schematic block diagram showing an example of a simplified configuration of a liquid crystal display according to the present invention. FIG. 1B is a schematic circuit diagram showing an example of a circuit configuration of one pixel of a liquid crystal display panel 1. FIG. 1C is a schematic plan view showing an example of a simplified configuration of the liquid crystal display panel 1. FIG. 1D is a schematic sectional view showing an example of a sectional structure along the line A-A in FIG. 1C.

As shown in FIG. 1A, an active matrix-type liquid crystal display includes, for example, a liquid crystal display panel 1, a first driver circuit 2, a second driver circuit 3, a control circuit 4, and a backlight 5.

The liquid crystal display panel 1 includes plural scanning signal lines (gate lines) GL and plural video signal lines (drain lines) DL. The video signal lines DL are connected to the first driver circuit 2, and the scanning signal lines GL are connected to the second driver circuit 3. A display area DA of the liquid crystal display panel 1 is constructed by a number of pixel groups. One pixel has a circuit configuration as shown in FIG. 1B, for example, in which one pixel has a TFT element Tr functioning as an active device, a pixel electrode PX, a common electrode CT (also referred to as an opposed electrode), and a liquid crystal layer LC (liquid crystal material). Moreover, in this case, the liquid crystal display panel 1 is provided with common lines CL that enable common electrodes CT of plural pixels to be connected and shared.

Furthermore, as shown in FIGS. 1C and 1D, the liquid crystal display panel 1 has a configuration in which the liquid crystal layer LC is disposed between an active matrix substrate 6 and an opposed substrate 7. In this case, the active matrix substrate 6 and the opposed substrate 7 are attached by a ring-shaped sealing agent 8 which are provided on the outer side of the display area DA, and the liquid crystal layer LC is sealed in a space that is surrounded by the active matrix substrate 6, the opposed substrate 7, and the sealing agent 8. Moreover, in this case, the liquid crystal display panel 1 of the liquid crystal display having the backlight 5 includes a pair of polarizers 9a and 9b that oppose each other while interposing the active matrix substrate 6, liquid crystal layer LC, and opposed substrate 7 therebetween.

The liquid crystal display according to the present embodiment may be provided with plural pillar-shaped spacers 10 which are formed in the space in which the liquid crystal layer LC is sealed so that the thickness (also referred to as a cell gap) of the liquid crystal layer LC in each pixel is made uniform.

The present invention relates to the material composition of the liquid crystal layer LC of the liquid crystal display panel 1 in the above-described active matrix-type liquid crystal display. Therefore, the detailed description of the configurations of the first and second driver circuits 2 and 3, control circuit 4, and backlight 5 which are not directly related to the present invention will be omitted.

As shown in FIG. 1B, in the liquid crystal display according to the present invention, the TFT element Tr is turned on when a voltage is applied to the scanning signal lines GL, and a voltage applied to the video signal lines DL is applied to the pixel electrode PX through the TFT element Tr, whereby a potential difference is generated between the pixel electrode PX and the common electrode CT and applied to the liquid crystal layer LC as a driving voltage. In this case, the liquid crystal layer LC having an optical isotropy exhibits an optical anisotropy, and thus, a light transmittance thereof can be changed. However, when the blue phase or the polymer-stabilized blue phase is used, the liquid crystal layer LC has Bragg diffraction light that is inherent to the phase structure. Thus, the contrast ratio may decrease due to the Bragg diffraction light appearing in the visible wavelength region (380 nm or higher and 750 nm or lower) or the light leakage originated in crash of phase structure caused by precipitation of the material used for the liquid crystal layer LC.

Figure 2:
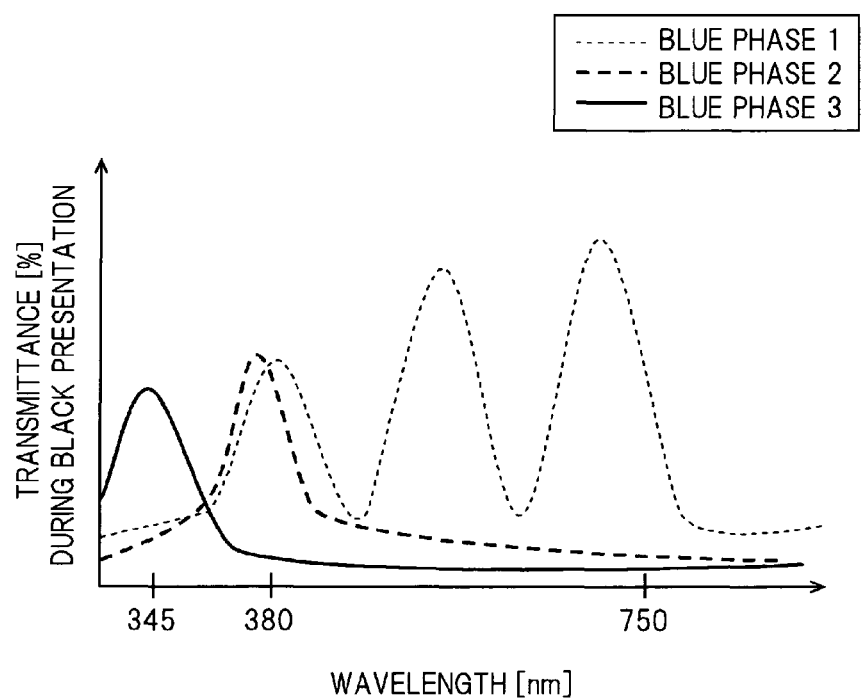
FIG. 2 schematically shows the transmittance spectrum of light and the wavelength of a light source being used.

In order to improve the contrast ratio, it is necessary that the Bragg diffraction wavelength is present in regions other than the visible wavelength region. FIG. 2 schematically shows the transmittance spectrum of a polymer-stabilized blue-phase liquid crystal display panel. The present inventors have made intensive investigation into various blue phases, for example, blue phases 1, 2, and 3. The blue phase 1 had its Bragg diffraction wavelength shifted to an infrared region, and the blue phases 2 and 3 had their Bragg diffraction wavelengths shifted to be 380 nm or lower. Like the spectrum of the blue phase 1, when the Bragg diffraction light appeared in the infrared wavelength region, a high-order diffraction wavelength appeared in the visible region. As a result of the investigation, it was found that it was effective for improvement of the contrast ratio to have the Bragg diffraction wavelength in an ultraviolet region (380 nm or lower), and preferably being 345 nm or lower in consideration of the influence of the spectrum distribution, like the blue phases 2 and 3. Here, the Bragg diffraction wavelength $\lambda_1$ is expressed by Expression 1 using an average refractive index n of a liquid crystal layer, a lattice size a (μm) of a blue phase, and Miller's indices h, k, and l.

[Expression 1]

$$\lambda_1 = \frac{2na}{\sqrt{h^2 + k^2 + l^2}} \quad (1)$$

It can be understood from the expression that by decreasing the lattice size a, it is possible to shift the diffraction wavelength towards the shorter wavelengths. Moreover, it can be known that the lattice size a (μm) is substantially equal to a pitch length P (μm) of a liquid crystalline compound of a chiral nematic phase. As shown in Expression 2 below, the pitch length P is calculated by the product of a helical twisting power (HTP) (μm$^{-1}$) of an added chiral dopant and a concentration c thereof. The concentration c of the chiral dopant in Expression 2 below is expressed by a molar fraction (which is defined as the amount of substance of one or plural kinds of chiral dopants being mixed divided by the total amount of substance of liquid crystals). The liquid crystal layer LC contains at least one kind of liquid crystalline compound and at least one kind of chiral dopant. Thus, the total amount of liquid crystals as mentioned herein means the sum of these materials. The liquid crystal layer LC may further contain a polymerizable monomer, and in this case, the amount of the polymerizable monomer is also included in the total amount of liquid crystals. When the polymerizable monomer is contained, the molar fraction of the polymerizable monomer is smaller than that of the liquid crystalline compound.

[Expression 2]

$$1/P = [HTP] \cdot c \quad (2)$$

Moreover, the pitch length P is calculated by Expression 3 below.

[Expression 3]

$$\lambda_2 = n \cdot P \quad (3)$$

In the expression, $\lambda_2$ is the center of a selective reflection wavelength of a chiral nematic phase.

A calculation method of $\lambda_2$ will be described. First, liquid crystals having the same composition ratio as that used in the liquid crystal layer LC are mixed with monomers, and similarly, the same chiral dopant as used in the liquid crystal layer LC is added to the mixture to prepare a solution. The solution is filled in a unit cell coated with parallel alignment films. Next, a planar state of a chiral nematic phase is realized, and $\lambda_2$ is obtained by measuring the light transmission or reflection spectrum. In this case, the helical twisting power of the chiral dopant changes with the temperature. The blue-phase liquid crystals are materials that transit from the chiral nematic phase to the blue phase and from the blue phase to the isotropic phase as the temperature increases. The transition temperatures are different depending on the composition of the blue-phase liquid crystals, and the polymer-stabilized blue-phase liquid crystals have a large temperature range where they exhibit the blue phase. Therefore, it is preferable that the helical twisting power of the chiral dopant be evaluated within a range of 10° C. below the temperature at which the liquid crystals transit from the chiral nematic phase to the blue phase (from the chiral nematic phase to the isotropic phase when the concentration of the chiral dopant is low), and alternatively, within a temperature range where the liquid crystals exhibit the blue phase. That is, the pitch length P can be calculated by measuring the above-mentioned values $\lambda_2$ and n at the temperature where the helical twisting power of the chiral dopant is evaluated. Moreover, the helical twisting power [HTP] of the chiral dopant is calculated from Expression 2. Moreover, since it is known that the pitch length P of the chiral nematic phase corresponds to the lattice size a of the blue phase 1, the helical twisting power [HTP] may be evaluated by calculating the lattice size a in the temperature range of the blue phase 1. In addition, it is known that the blue phase 1 has a body centered cubic structure of which the lattice constant is in the order of several hundred nm, and the Bragg diffraction is observed on (110) plane, (200) plane, (211) plane, and the like. The lattice size a of the blue phase 1 can be calculated by Expression 4 below using a peak wavelength $\lambda_1{}'$ of the (110) plane appearing on the longest wavelength side and the average refractive index n by measuring the transmission or reflection spectrum of the blue phase 1, for example.

[Expression 4]

$$\lambda_1{}' = 2^{1/2} n a \quad (4)$$

The transmission or reflection spectrum can be measured using a spectrometer U-3500 (available from Hitachi Corporation) and a spectromicroscope LVmicro-III (available from Lambda Vision Corporation).

Moreover, n is obtained by coating liquid crystal materials on a substrate and measuring the refractive index. The refractive index can be measured using a prism coupler and an Abbe refraction meter, for example.

Figure 3:
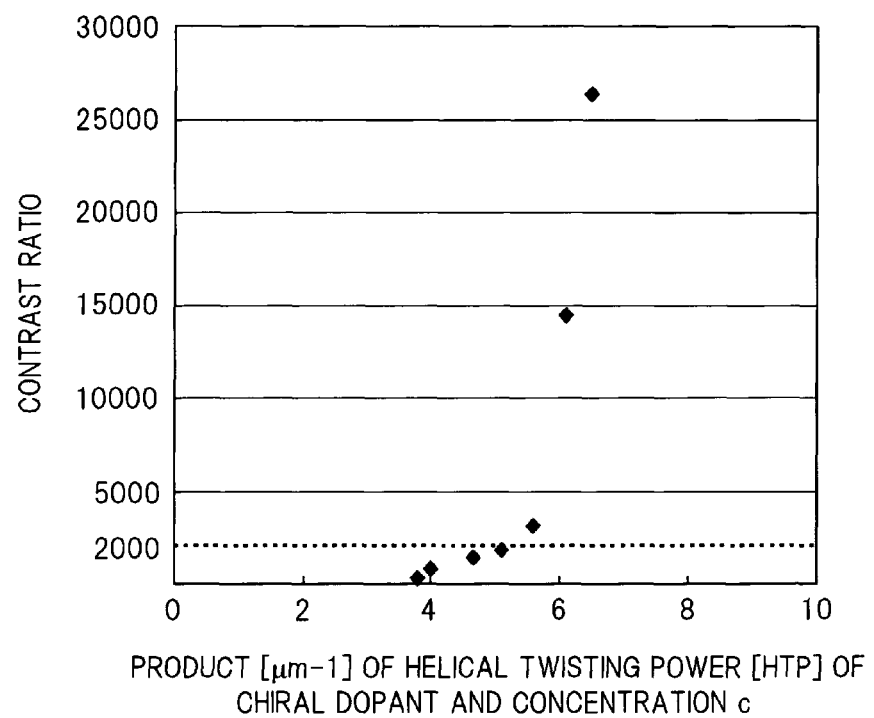
FIG. 3 is a graph showing the relationship between the product of the helical twisting power and the concentration of chiral dopants and a contrast ratio.

FIG. 3 shows the evaluation results of the relationship between the product of the helical twisting power of the chiral dopant and the concentration and the contrast ratio. The contrast ratio as mentioned herein means a value obtained by dividing the luminance when a white image is presented on the entire screen of a liquid crystal display (that is, the luminance corresponding to the gray scale 255 in terms of the gray scale level) by the luminance when a black image is presented on the entire screen (that is, the luminance corresponding to the gray scale 0 in terms of the gray scale level). In this case, when the black image is presented, a backlight is lit similarly to when the white image is presented. Since the helical twisting power of the chiral dopant changes with the temperature, the helical twisting power is evaluated within a range of 10° C. below the temperature at which the liquid crystals transit from the chiral nematic phase to the blue phase (or from the chiral nematic phase to the isotropic phase), and alternatively, within a temperature range where the liquid crystals exhibit the blue phase. In addition, since it is known that one twisting period of the chiral nematic phase corresponds to the lattice size of the blue phase I, the lattice size may be calculated within the temperature range of the blue phase I and the helical twisting power may be evaluated in the temperature range of the blue phase I. The contrast ratio of a liquid crystal display filled with nematic-phase liquid crystals was evaluated for comparison and was 2000 or lower. Therefore, it can be understood from the above that in order to improve the contrast ratio further from that of the nematic-phase liquid crystal display, the product of the helical twisting power [HTP] of the chiral dopant and the concentration c is preferably 5.5 ($\mu m^{-1}$) or more, and for a dramatic improvement, 6.0 ($\mu m^{-1}$) or more.

However, the concentration of the chiral dopant is limited by the solubility to liquid crystals. That is, the upper limit of the solubility is determined by a saturation solubility, and thus, the chiral dopant will be precipitated if added in an amount equal to or greater than the saturation solubility at the use temperature (in the present embodiment, 0 to 70° C.) of the liquid crystal display. Therefore, it is necessary that the concentration of the chiral dopant being added is equal to or smaller than the saturation solubility. In this specification, the concentration and saturation solubility of the chiral dopant are expressed by a molar fraction unless otherwise noted.

The saturation solubility can be calculated, for example, by comparing the peak intensities in a liquid chromatogram (HPLC) of a reference solution having a known concentration and a saturated solution. Liquid crystals having the same composition ratio as that used in the liquid crystal layer LC are mixed with monomers, and similarly, the same chiral dopant as used in the liquid crystal layer LC is added to the mixture to prepare a reference solution having a known solubility and a saturated solution. The reference solution is prepared by adding a scaled chiral dopant to the scaled mixture of liquid crystals and monomers. In order to prepare the saturated solution at the lowest temperature (specifically, 0° C.) of the use temperature of the liquid crystal display, the chiral dopant is added to the mixture of liquid crystals and monomers until the chiral dopant is precipitated and left for several hours in a constant-temperature bath at the lowest temperature of the use temperature together with an instrument for handling the liquid crystals. Then, a supernatant of the solution in the constant-temperature bath is taken as the saturated solution at the lowest temperature of the use temperature.

From the above, by adding a chiral dopant of which the product of the helical twisting power and the saturation solubility is 5.5 or more, and preferably, 6.0 or more, it is possible to achieve a high contrast ratio. Moreover, in a liquid crystal layer containing a liquid crystalline compound and a chiral dopant, and alternatively, further containing a polymerizable monomer, the pitch length P (chiral pitch) of the chiral nematic phase is 180 nm or smaller, and preferably, 160 nm or smaller. Specifically, in JP-A-2008-266633, the liquid crystal display device or the like exhibits an optical isotropy when no electric field is applied. But the liquid crystal display of this embodiment is not limited to this, and, for example, the liquid crystal layer LC may not exhibit a strict optical isotropy when no electric field is applied.

Next, the case where plural kinds (hereinafter referred to as n kinds, and n is a natural number of 2 or more) of chiral dopants are added to the liquid crystal materials will be described. The concentration c of the plural kinds of chiral dopants (namely, a mixture of plural chiral dopants) is equal to or smaller than the saturation solubility s of the mixture of plural chiral dopants. Here, the concentration of each of the n kinds of chiral dopants will be referred to as a concentration $c_i$ (i is a natural number of 1 or more and n or smaller). Moreover, the concentration $c_i$ of each chiral dopant is preferably equal to or smaller than a saturation solubility $s_i$ of each of the chiral dopants. Furthermore, for each chiral dopant, a peak wavelength of the Bragg diffraction light of the blue phase is preferably equal to or smaller than 380 nm, and more preferably, equal to or smaller than 345 nm.

Therefore, by making sure that the helical twisting power [HTP] of the mixture of plural chiral dopants and the concentration c of the mixture of plural chiral dopants satisfy a relation of [HTP]·c≥5.5 ($\mu m^{-1}$), it is possible to improve the contrast ratio further. Moreover, by making them satisfy a relation of [HTP]·c≥6.0 ($\mu m^{-1}$), it is possible to improve the contrast ratio further more.

If the helical twisting power of each chiral dopant is $[HTP]_i$, at least one of the n kinds of chiral dopants may not satisfy a relation of $[HTP]_i \cdot s_i \geq 5.5$ ($\mu m^{-1}$). Moreover, none of the n kinds of chiral dopants may satisfy a relation of $[HTP]_i \cdot s_i \geq 5.5$ ($\mu m^{-1}$).

From the above, by using plural kinds of chiral dopants, it is possible to improve the contrast ratio. Moreover, it is possible to provide a liquid crystal display which provides improved phase stability and small temperature dependence as compared to the case of using one kind of chiral dopant.

In the case of using plural kinds of chiral dopants, when a chiral dopant exhibiting a positive optical rotation property and a chiral dopant exhibiting a negative optical rotation property are used together, the helical twisting power is cancelled. Therefore, in order to make the Bragg diffraction wavelength of the blue phase be 380 nm or smaller, it may easily become necessary to increase the amount of chiral dopants being added rather than using only one kind of chiral dopant, or alternatively, to use a mixture of two or more kinds of chiral dopants exhibiting the same polarization. However, it is effective from the perspective of achieving phase stability and small temperature dependence. The helical twisting power [HTP] of the plural kinds of chiral dopants is evaluated by preparing a solution similarly to the above-described method and measuring the light transmission or reflection spectrum within a range of 10° C. below the temperature at which the liquid crystals transition from the chiral nematic phase to the blue phase, and alternatively, within a temperature range where the liquid crystals exhibit the blue phase. Moreover, the saturation solubility s of the plural kinds of chiral dopants can be calculated, similar to the above-described method, by comparing the peak intensities in a liquid chromatogram (HPLC) of a reference solution having a known concentration and a saturated solution. The plural kinds of chiral dopants being used are added while maintaining the ratio of each chiral dopant until they are precipitated and left for several hours. That is, the plural kinds of chiral dopants are treated as one kind of chiral dopant in which the plural kinds of chiral dopants are mixed in predetermined composition ratios, and the helical twisting power [HTP] and the saturation solubility s of the mixture of plural chiral dopants are calculated by the same method as the method of calculating the helical twisting power [HTP] and the saturation solubility s of one kind of chiral dopant.

When the helical twisting power $[HTP]_i$ of each chiral dopant is evaluated, they are evaluated by preparing the same solution as used for evaluating the helical twisting power [HTP] of the plural kinds of chiral dopants except that only one of the plural kinds of chiral dopants is added. The helical twisting power $[HTP]_i$ is evaluated for each of the solutions in which each chiral dopant is added, within 10° C. below the temperature at which the liquid crystals transition from the chiral nematic phase to the blue phase, and alternatively, within a temperature range where the liquid crystals exhibit the blue phase. Moreover, the saturation solubility $s_i$ of each chiral dopant is calculated by preparing the same reference solution as that used for calculating the saturation solubility of the plural kinds of chiral dopants except that only one kind of chiral dopant is added and adding the chiral dopant until the one kind of chiral dopant is precipitated and leaving the solution for several hours.

Next, specific examples for solving the above-described problems will be described.

EXAMPLE 1

FIGS. 4A to 4F are schematic diagrams showing an example of a simplified configuration of an IPS-mode liquid crystal display panel according to Example 1 of the present invention.

Figure 4A:
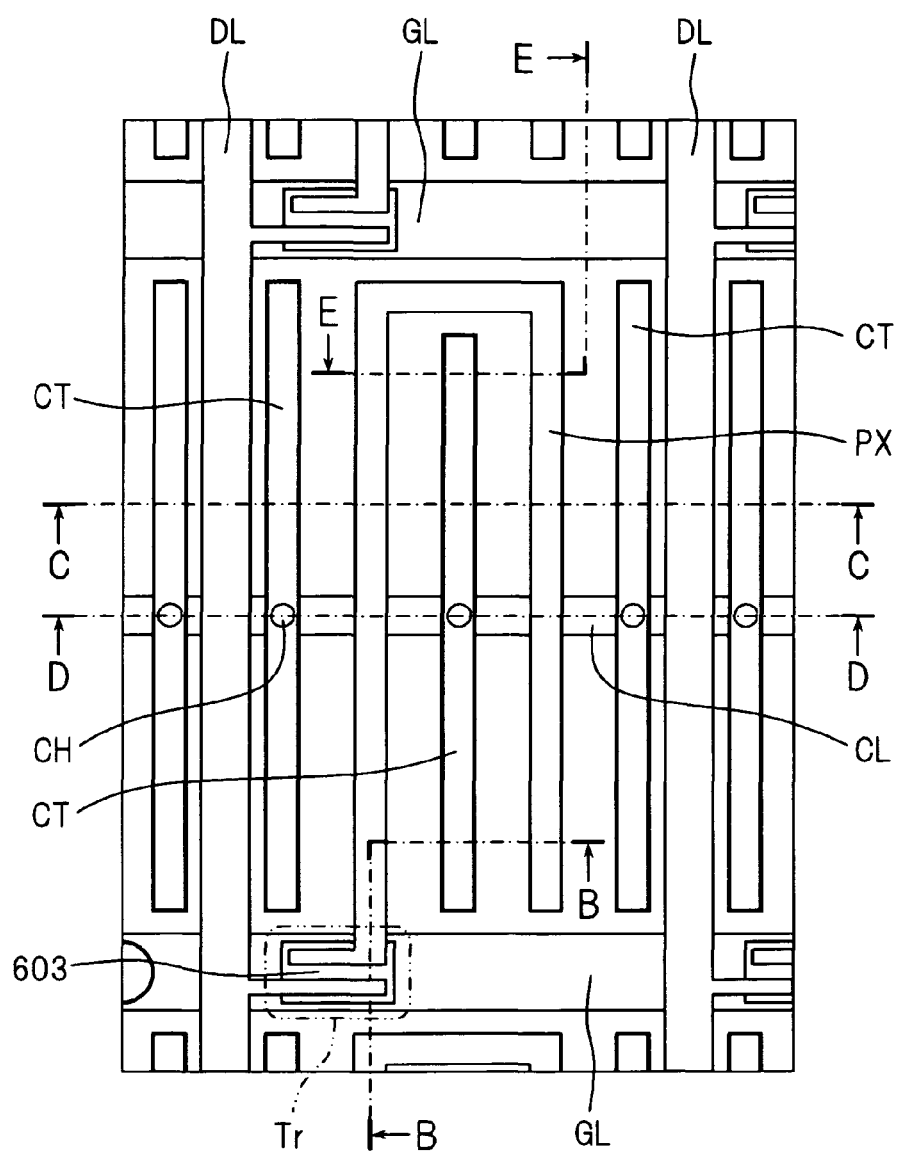
FIG. 4A is a schematic plan view showing an example of a plan-view structure of one pixel of an active matrix substrate in a liquid crystal display panel of Example 1.
Figure 4B:
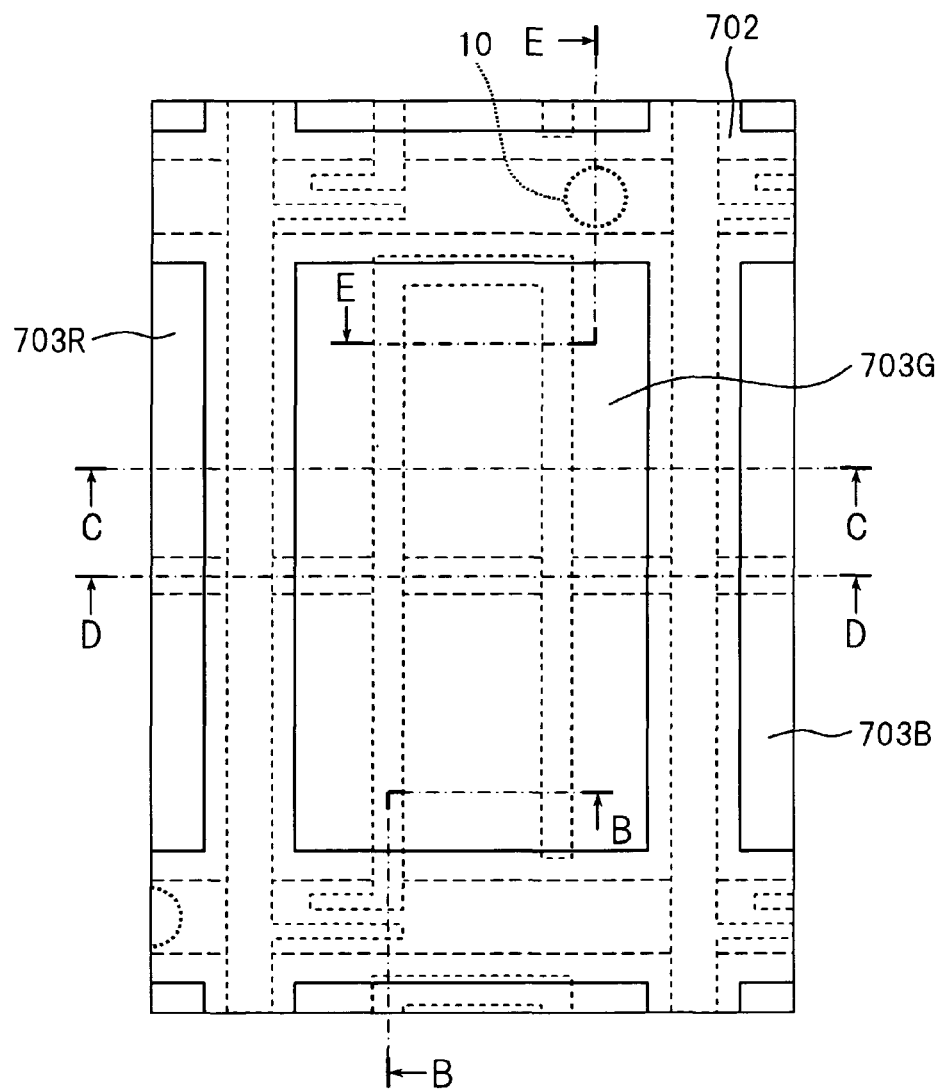
FIG. 4B is a schematic plan view showing an example of a plan-view structure when an opposed substrate is overlaid on the region shown in FIG. 4A.
Figure 4C:
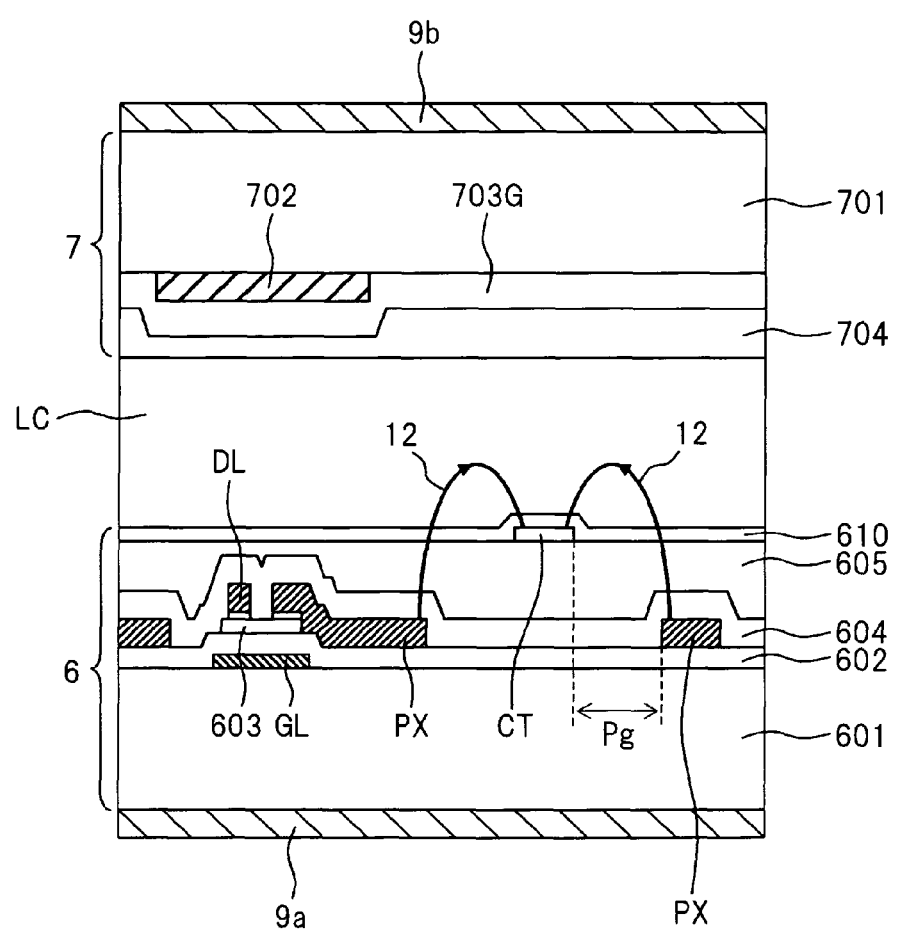
FIG. 4C is a schematic sectional view showing an example of a sectional structure along the line B-B in FIGS. 4A and 4B.
Figure 4D:
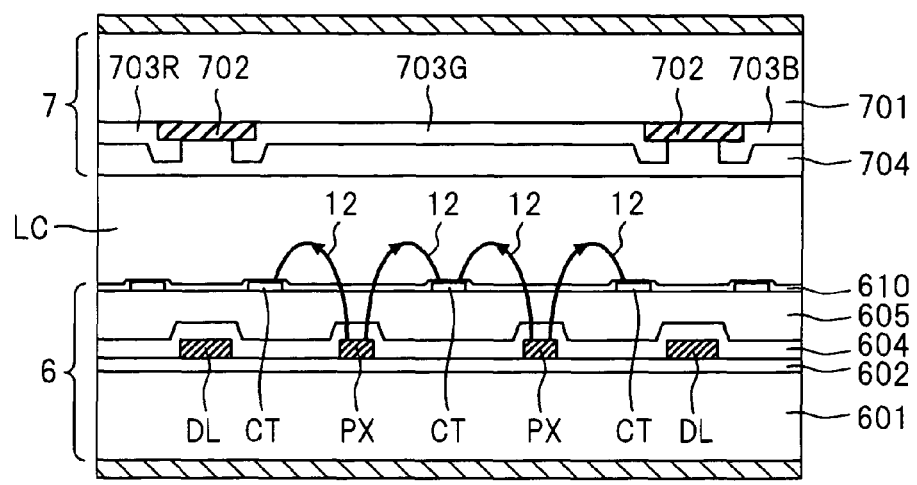
FIG. 4D is a schematic sectional view showing an example of a sectional structure along the line C-C in FIGS. 4A and 4B.
Figure 4E:
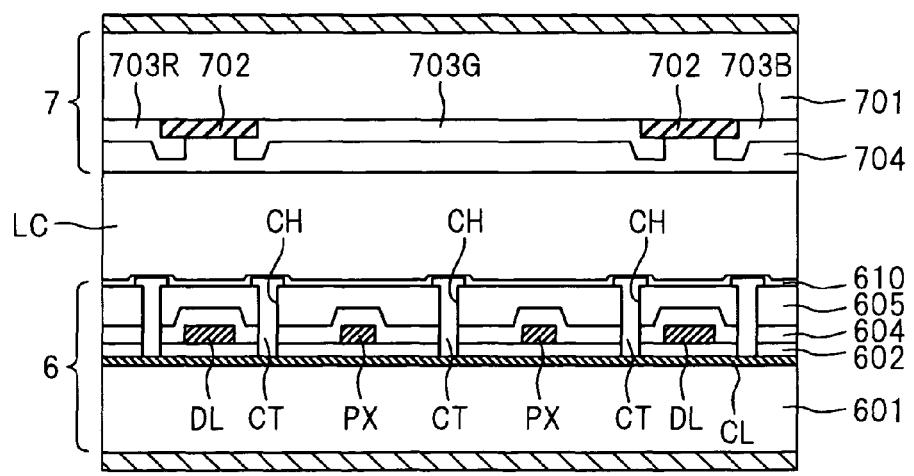
FIG. 4E is a schematic sectional view showing an example of a sectional structure along the line D-D in FIGS. 4A and 4B.
Figure 4F:
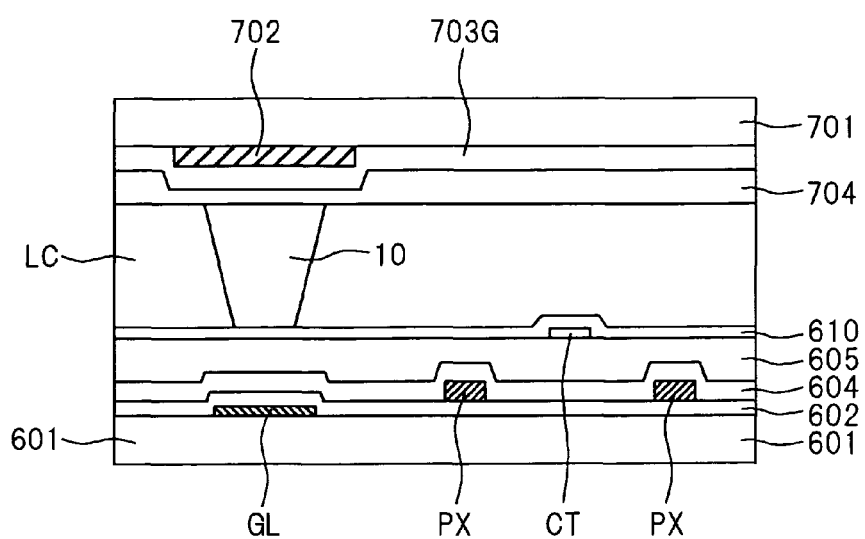
FIG. 4F is a schematic sectional view showing an example of a sectional structure along the line E-E in FIGS. 4A and 4B.

FIG. 4A is a schematic plan view showing an example of a plan-view structure of one pixel of an active matrix substrate in a liquid crystal display panel of Example 1. FIG. 4B is a schematic plan view showing an example of a plan-view structure when an opposed substrate is overlaid on the region shown in FIG. 4A. FIG. 4C is a schematic sectional view showing an example of a sectional structure along the line B-B in FIGS. 4A and 4B. FIG. 4D is a schematic sectional view showing an example of a sectional structure along the line C-C in FIGS. 4A and 4B. FIG. 4E is a schematic sectional view showing an example of a sectional structure along the line D-D in FIGS. 4A and 4B. FIG. 4F is a schematic sectional view showing an example of a sectional structure along the line E-E in FIGS. 4A and 4B.

The lines B-B, C-C, D-D, and E-E in FIG. 4A are the lines B-B, C-C, D-D, and E-E in FIG. 4B being projected on the active matrix substrate 6. FIG. 4F shows only the sectional structure of the liquid crystal layer LC and the neighboring constituent elements thereof which are the active matrix substrate 6 and the opposed substrate 7.

In Example 1, an IPS-mode liquid crystal display panel will be described as an example of the liquid crystal display panel 1 according to the present invention. In this case, one pixel of the liquid crystal display panel 1 and the peripheral region thereof have a configuration as shown in FIGS. 4A to 4F, for example.

The active matrix substrate 6 is provided with the scanning signal lines GL and common lines CL, and a first insulating layer 602 covering the lines GL and CL, which are formed on a surface of an insulating substrate such as a glass substrate 601.

On the first insulating layer 602, a semiconductor layer 603 of the TFT element Tr, the video signal lines DL and pixel electrodes PX, and a second insulating layer 604 covering the video signal lines DL and pixel electrodes PX are formed. The semiconductor layer 603 is disposed on the scanning signal lines GL, and a portion of each of the scanning signal lines GL disposed below the semiconductor layer 603 functions as the gate electrode of the TFT element Tr. Moreover, the semiconductor layer 603 has a configuration in which source and drain diffusion layers are stacked on an active layer (channel forming layer) formed from a first amorphous silicon, and the source and drain diffusion layer are formed from a second amorphous silicon of which the kind and concentration of impurities are different from those of the first amorphous silicon. In this case, a portion of each of the video signal lines DL and a portion of each of the pixel electrodes PX are formed so as to ride over the semiconductor layer 603, and the portions riding over the semiconductor layer 603 function as the drain and source electrodes of the TFT element Tr, respectively.

It should be noted that the notations of the source and drain of the TFT element Tr can be replaced with each other depending on the relationship of their biases, namely the magnitude relationship between the potential of the pixel electrode PX and the potential of the video signal line DL when the TFT element Tr is turned on. However, in the following description of this specification, an electrode connected to the video signal line DL will be referred to as a drain electrode, and an electrode connected to the pixel electrode PX will be referred to as a source electrode.

A third insulating layer 605 (overcoat layer) having a planarized top surface is formed on the second insulating layer 604.

On the third insulating layer 605, the common electrodes CT and a transparent layer 610 covering the common electrodes CT and third insulating layer 605 are formed. The common electrodes CT are connected to the common lines CL through a contact hole CH (through-hole) that penetrates through the first, second, and third insulating layers 602, 604, and 605. Moreover, the common electrodes CT are formed so that a gap Pg (see FIG. 4C) between the common electrodes CT and the pixel electrodes PX in the plan view shown in FIG. 4A is about 7 μm.

In Example 1, the liquid crystal layer LC of the liquid crystal display panel 1 contains liquid crystals and a chiral dopant, and the liquid crystal layer LC contains blue-phase or polymer-stabilized blue-phase liquid crystals of which the product of the helical twisting power (HTP) and the saturation solubility s of a chiral dopant is 5.5 ($\mu m^{-1}$), and preferably, 6.0 ($\mu m^{-1}$) or higher. The saturation solubility s as mentioned herein means a saturation solubility at the lowest temperature of the use temperature of a liquid crystal display. The HTP as mentioned herein is a value that is evaluated within a range of 10° C. below the temperature at which the liquid crystals transition from the chiral nematic phase to the blue phase (or from the chiral nematic phase to the isotropic phase), and alternatively, within a temperature range where the liquid crystals exhibit the blue phase.

In Example 1, the helical twisting power and the saturation solubility of the chiral dopant were evaluated by the following method. The helical twisting power was evaluated by a method which involves dissolving a chiral dopant in a liquid crystal component, measuring a characteristic reflection of the planar state of a chiral nematic phase, and evaluating a pitch length. Then, the helical twisting power [HTP] was calculated from the concentration c of the chiral dopant and an inverse 1/P of the pitch length. In this case, since the pitch length P changes with a temperature, the pitch size around the transition temperature from the chiral nematic phase to the blue phase was used. Around the transition temperature as mentioned herein means a temperature that is 5° C. lower than the transition temperature. The temperature at which [HTP] is evaluated is particularly preferably 5° C. lower than the transition temperature from the chiral nematic phase to the blue phase. In addition, the saturation solubility was calculated by a method which involves adding a chiral dopant to a liquid crystal component to obtain a solution, leaving the solution for 12 hours or more at the lowest temperature of the use temperature range to obtain a saturated solution, and calculating the saturation solubility of a supernatant liquid of the saturated solution.

Since the peak wavelength of the Bragg diffraction which is the cause of the low contrast ratio appears at 380 nm or lower, it is possible to decrease the transmittance during black presentation. In addition, since the amount of the chiral dopant added to the liquid crystals is equal to or smaller than the saturation solubility, and it is possible to form stable blue-phase liquid crystals with no precipitation of the chiral dopant, occurring light leakage will be suppressed. By using a liquid crystal display panel having such a liquid crystal layer LC, it is possible to achieve a high contrast ratio.

The molecular structure of the chiral dopant contained in the liquid crystal layer LC desirably has an asymmetric axis and a structure similar to liquid crystals. As the chiral dopant, a chiral compound having a circular optical activity such as a binaphthyl derivative, an abietic acid derivative, or an isosorbide derivative may be used.

Meanwhile, the opposed substrate 7 is provided with an black matrix 702, color filters 703R, 703G, and 703B, and an overcoat layer 704 covering the black matrix 702 and the three color filters which are formed on a surface of an insulating substrate such as a glass substrate 701. The black matrix 702 is a lattice-shaped light-shielding film for forming an opening region for each pixel unit in the display area DA. Moreover, the color filters 703R, 703G, and 703B are films that allow only light in a specific wavelength region (of a specific color) among white light from the backlight 5 to pass therethrough. When the liquid crystal display corresponds to an RGB-type color presentation, the color filter 703R allows red light to pass therethrough, and the color filters 703G and 703B allow green and blue light to pass therethrough, respectively. The overcoat layer 704 has a planarized top surface.

On the overcoat layer 704, plural pillar-shaped spacers 10 are formed. The pillar-shaped spacers 10 have a conical trapezoidal shape with a flat top (trapezoidal solid of revolution), for example, and are formed at positions on the active matrix substrate 6 where they overlap with portions of the scanning signal lines GL, excluding the portions intersecting the video signal lines DL and the portions where the TFT elements Tr are disposed.

When the TFT elements Tr are turned on, a gray scale level being applied to the video signal lines DL is written to the pixel electrodes PX, and a potential difference occurs between the pixel electrodes PX and the common electrodes CT. In this way, as shown in FIGS. 4B and 4C, an electric field (electric line of force) 12 having an intensity corresponding to the potential difference between the pixel electrodes PX and the common electrodes CT is generated and applied to the liquid crystal layer LC. In this case, by an interaction of the electric field 12 and the dielectric anisotropy of the liquid crystal layer LC, the anisotropy of the refractive index of the liquid crystal layer LC is changed. Moreover, in this case, the magnitude of the anisotropy of the refractive index is determined by the intensity of the applied electric field 12 (that is, the magnitude of the potential difference between the pixel electrodes PX and the common electrodes CT). Therefore, in the liquid crystal display, by controlling the gray scale level applied to the pixel electrodes PX for each pixel while maintaining the potential of the common electrodes CT to be constant, for example, and changing the light transmittance in each pixel, it is possible to perform video and image presentation.

Hereinafter, an example of a manufacturing method of the liquid crystal display panel 1 of Example 1 will be described. In describing the manufacturing method of the liquid crystal display panel 1 of Example 1, detailed description of steps which can be performed by the same procedures as the manufacturing method of a liquid crystal display panel of the related art will be omitted.

The manufacturing method of the liquid crystal display panel 1 of Example 1 is roughly divided into three steps which are a step of forming the active matrix substrate 6, a step of forming the opposed substrate 7, and a step of attaching the active matrix substrate 6 and the opposed substrate 7 and filling liquid crystal materials (the liquid crystal layer LC) between them.

In the step of forming the active matrix substrate 6, a surface-polished glass substrate 601 having a thickness of 0.7 mm is used, for example. First, scanning single lines GL and common lines CL are formed on the surface of the glass substrate 601. The scanning signal lines GL and the common lines CL are formed, for example, by etching a metal film which is formed from a chrome film (Cr film) or the like so as to cover the entire surface of the glass substrate 601.

Subsequently, a first insulating layer 602 is formed. The first insulating layer 602 is formed, for example, by depositing a silicon nitride film having a thickness of about 0.3 μm on the entire surface of the glass substrate 601.

Subsequently, an island-shaped semiconductor film is formed using the semiconductor layer 603 of the TFT elements Tr. The island-shaped semiconductor film is formed, for example, by etching an amorphous silicon film which is formed on the entire surface of the first insulating layer 602. In this case, the amorphous silicon film is formed by sequentially stacking first and second amorphous silicon layers of which the conductivity types or the kinds and concentrations of the impurities are different from each other. Moreover, at the same time as when the island-shaped semiconductor film is formed, a short-circuit prevention layer or the like is also formed so as to be interposed between the intersections of the scanning signal lines GL and the video signal lines DL, for example.

Subsequently, the video signal lines DL and the pixel electrodes PX are formed. The video signal lines DL and the pixel electrodes PX are formed, for example, by etching a metal film such as a chrome film which is formed on the first insulating layer 602. In this case, the video signal lines DL are formed into a shape such as to have portions riding over the island-shaped semiconductor film, namely portions which function as the drain electrodes of the TFT elements Tr. Moreover, in this case, the pixel electrodes PX are formed into a shape such as to have portions riding over the island-shaped semiconductor film, namely portions which function as the source electrodes of the TFT elements Tr.

Subsequently, the second amorphous silicon layer of the island-shaped semiconductor film is etched with the video signal lines DL and pixel electrodes PX being masked so as to be divided into a drain diffusion layer and a source diffusion layer, whereby the semiconductor layer 603 of the TFT elements Tr is obtained.

Subsequently, second and third insulating layers 604 and 605 are formed. The second insulating layer 604 is formed, for example, by depositing a silicon nitride film having a thickness of 0.3 μm. The third insulating layer 605 is formed, for example, by applying a non-cured acrylic resin, heating the resin under a predetermined condition, for example, for one hour at a temperature of 220° C., and curing the resin. Moreover, the third insulating layer 605 may be formed using, for example, a heat-curable resin such as epoxy acrylic resin or polyimide resin which has excellent insulation and transparency. Furthermore, the third insulating layer 605 may be formed using, for example, a photo-curable transparent resin and an inorganic material such as polysiloxane.

Subsequently, a contact hole CH is formed on a predetermined region of the common lines CL so as to penetrate through the first, second, and third insulating layers 602, 604, and 605. The contact hole CH is formed by etching the first, second, and third insulating layers 602, 604, and 605.

Subsequently, common electrodes CT are formed. The common electrodes CT are formed by etching a transparent conductive film which is an ITO film or the like deposited to a thickness of about 50 nm on the third insulating layer 605.

The step of forming the opposed substrate 7 of the liquid crystal display panel 1 of Example 1 is the same as the procedure of the related art, and description thereof will be omitted.

The step of attaching the active matrix substrate 6 and the opposed substrate 7 formed by the above-described procedures and filling liquid crystal materials therebetween involves, for example, applying a ring-shaped sealing agent 8 to the peripheral portion of the display area DA of the opposed substrate 7, dropping liquid crystal materials to a region surrounded by the sealing agent 8, and attaching the active matrix substrate 6 to the opposed substrate 7.

The liquid crystal materials of the liquid crystal layer LC of this example were prepared by mixing nematic liquid crystals JC1041XX (available from Chisso Corporation) and 4-pentyl-4'-cyanobiphenyl (5CB) (available from Aldrich Corporation) with the same molar fractions and adding a binaphthyl derivative represented by Chemical Formula 1 as a chiral dopant to the mixture. In this example, three kinds of liquid crystal materials which are prepared with different concentrations in order to achieve a high contrast ratio will be described.

[Chemical Formula 1]

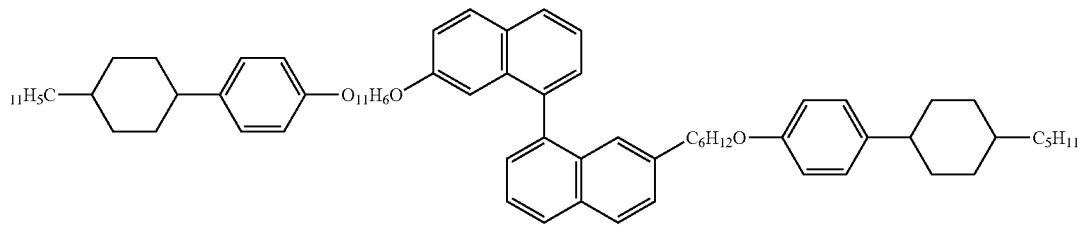

(1)

The Bragg diffraction wavelength was controlled by the concentration of the added binaphthyl derivative. Liquid crystal material A was added to a concentration of 2.4 mol % so that the Bragg diffraction wavelength became 380 nm, and liquid crystal materials B and C were added to concentrations of 2.6 and 2.8 mol % so that the Bragg diffraction wavelengths became 345 nm and 321 nm, respectively. Thereafter, a monomer mixture having a concentration of 6.3 mol % was prepared by mixing, as a crosslinking agent, 2-ethylhexyl acrylate (EHA) (available from Aldrich Corporation) and RM257 (available from Merck Corporation) with a mixture ratio of 7:3 to the liquid crystal materials. Moreover, 10 wt % of 2,2-dimethoxyphenylacetophenone (DMPAP) (available from Aldrich Corporation) to the weight of the monomer mixture was added as a photo-polymerization initiator and heated to be distributed uniformly. By decreasing the amount of the monomers added to the liquid crystals, polymer-stabilized blue-phase liquid crystals are formed.

Polymer-stabilized blue-phase liquid crystals were formed by irradiating the liquid crystal mixture with ultraviolet light (365 nm) at an irradiation intensity of 1.8 mWcm$^{-2}$ while maintaining the temperature of the panel to be constant over the temperature range where the liquid crystal mixture exhibits the blue phase I. In this case, the active matrix substrate 6 and the opposed substrate 7 were attached so that the thickness (cell gap) of the liquid crystal layer LC became approximately the same as the height of the pillar-shaped spacers 10, for example, 25 μm. By increasing the thickness of the liquid crystal layer LC, a panel was produced which was rarely influenced by retardation. In this example, although the liquid crystal layer LC had a thickness of 25 μm, the liquid crystal layer LC may be thinner.

After the active matrix substrate 6 and the opposed substrate 7 are attached with the liquid crystal materials filled therebetween, unnecessary portions (marginal portions) on the peripheries of the glass substrates 601 and 701 are cut and removed, and polarizers 9a and 9b are attached thereto. When attaching the polarizers 9a and 9b, the polarization transmission axes of the two polarizers are made orthogonal to each other. After that, the first and second driver circuits 2 and 3, the control circuit 4, the backlight 5, and the like are connected to form a module, whereby a liquid crystal display having the liquid crystal display panel 1 of Example 1 is obtained. The liquid crystal display panel 1 of Example 1 is a normally closed panel such that it provides a dark presentation (low-luminance presentation) when the potential difference between the pixel electrode PX and the common electrode CT is small and provides a bright presentation (high-luminance presentation) when the potential difference between the pixel electrode PX and the common electrode CT is large.

It was confirmed that the product of the helical twisting power and the saturation solubility of the binaphthyl derivative in this example was 28.7 (μm$^{-1}$), and the products of the helical twisting power and the concentration of the liquid crystal materials A, B, and C were 5.5 (μm$^{-1}$), 6.0 (μm$^{-1}$), and 6.5 (μm$^{-1}$), respectively. Moreover, panel stability was confirmed under microscopic observation. The stability was confirmed by the fact that the precipitation of materials was not observed when the liquid crystal materials A, B, and C of the liquid crystal layer LC were dissolved and left for 10 days or more at a room temperature. Moreover, the liquid crystal display panels using the liquid crystal materials A, B, and C were observed with the naked eye. When the liquid crystal materials A were filled in a unit cell made from glass, it was confirmed that the peak transmission spectrum under the crossed Nicol state appeared at 380 nm or lower. Even with the influence of spectrum distribution, the contrast ratio was 2000 or higher which was equal to or higher than that of the nematic phase. Furthermore, the liquid crystal display panels using the liquid crystal materials B and C of which the Bragg diffraction wavelengths were 345 nm or lower were observed with the naked eye by the same method, and the transmission spectrums were measured. The measurement results showed that the peak of the Bragg diffraction wavelength did not appear in the visible region with the liquid crystal display panels exhibiting no any particular color. Furthermore, it was confirmed that the contrast ratios of these liquid crystal display panels were improved dramatically.

The contrast ratio of the liquid crystal display having the liquid crystal display panel 1 of Example 1 was evaluated. As shown in FIG. 3, it was confirmed that the contrast ratio of the liquid crystal display panel 1 of this example was 2000 or higher which was higher as compared to the nematic phase. However, when the liquid crystal materials A were used, the black presentation looked violet. Therefore, in order to improve the contrast ratio dramatically, the liquid crystal materials B and C are preferable. In addition, it was found that such a chiral dopant should satisfy a relation of [HTP]·c≥5.5 (μm$^{-1}$), and more preferably, a relation of [HTP]·c≥6.0 (μm$^{-1}$).

In Example 1, although the IPS-mode liquid crystal display panel 1 having such a pixel configuration as shown in FIGS. 4A to 4F was used, the pixel configuration, for example, the plan-view shapes (plan-view layout) of the TFT elements Tr, pixel electrodes PX, and common electrodes CT, is not limited to this but may be appropriately changed.

Although the TFT elements Tr shown in FIGS. 4A and 4C have a bottom-gate structure in which the semiconductor layer 603 is disposed on the scanning signal lines GL, the transistor structure is not limited to this, but a top-gate structure in which the semiconductor layer 603 is disposed between the glass substrate 601 and the scanning signal lines GL is also possible. Moreover, an alignment film or the like may be formed on the surfaces of the active matrix substrate 6 and the opposed substrate 7 disposed close to the liquid crystal layer LC. Although the blue-phase liquid crystals can be prepared without an alignment film like this example, similarly to the case of using the existing nematic-phase liquid crystals, the blue-phase liquid crystals may be prepared by forming an alignment film from a polyimide resin which is obtained by heating a polyamide acid and performing a rubbing treatment for providing a liquid crystal aligning function on the surface of the alignment film.

EXAMPLE 2

Figure 5A:
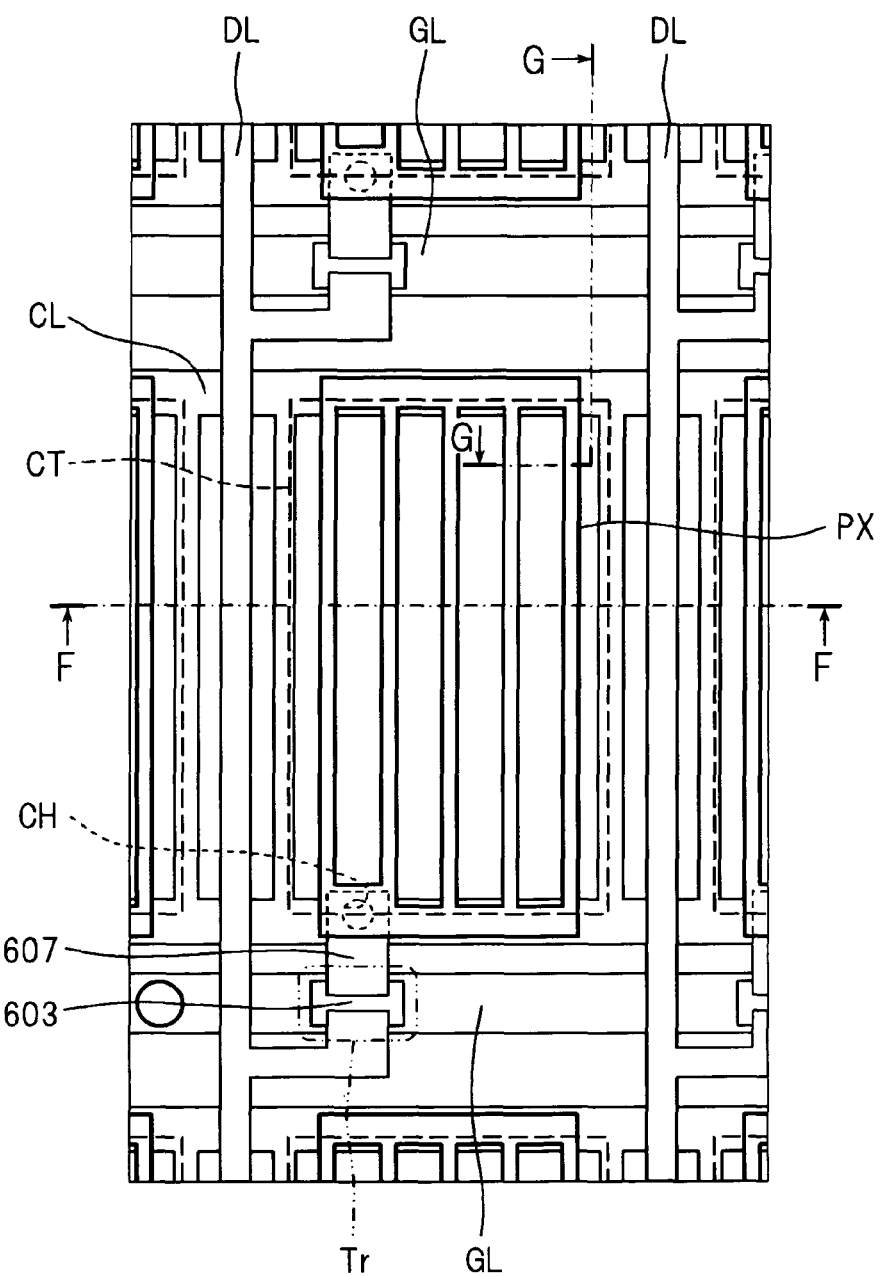
FIG. 5A is a schematic plan view showing an example of a plan-view structure of one pixel of an active matrix substrate in a liquid crystal display panel of Example 2.
Figure 5B:
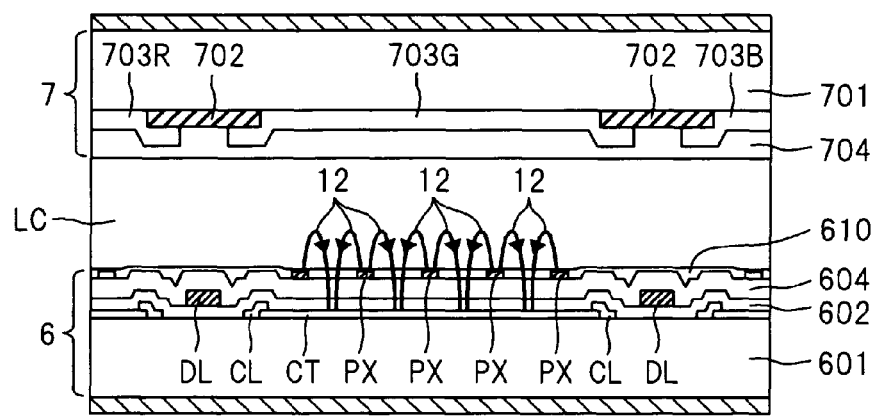
FIG. 5B is a schematic sectional view showing an example of a sectional structure along the line F-F in FIG. 5A.
Figure 5C:
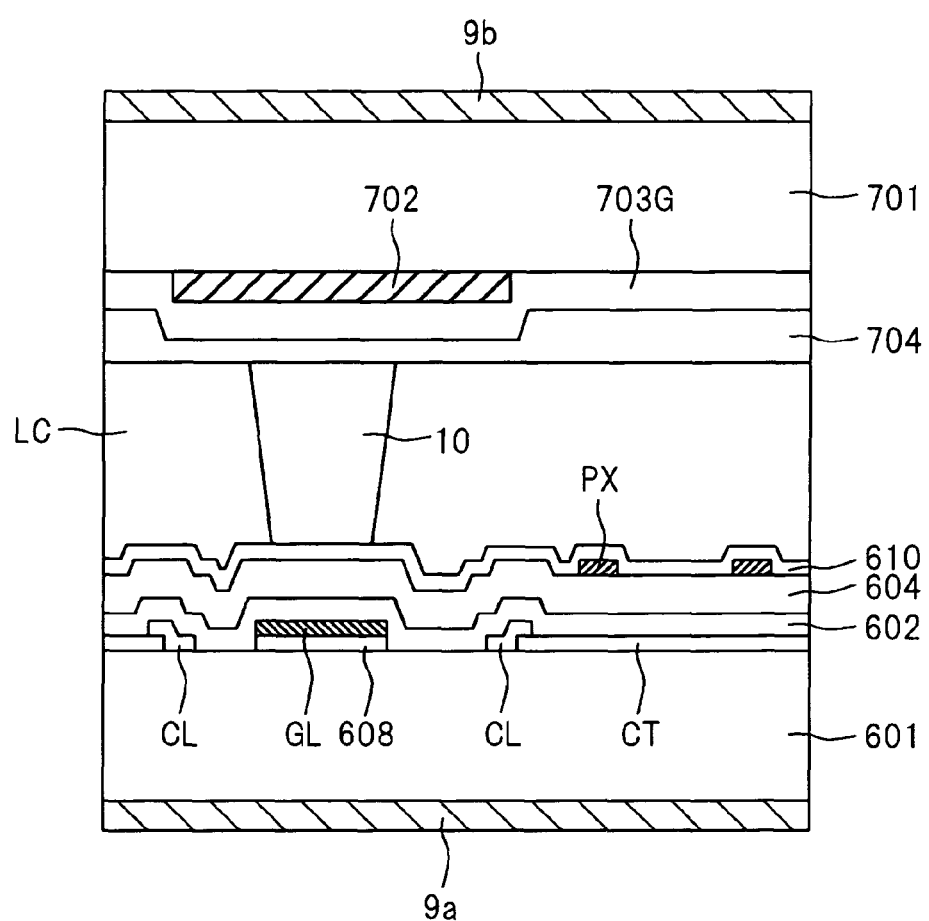
FIG. 5C is a schematic sectional view showing an example of a sectional structure along the line G-G in FIG. 5A.

FIGS. 5A to 5C are schematic diagrams showing an example of a simplified configuration of an FFS-mode liquid crystal display panel according to Example 2 of the present invention.

FIG. 5A is a schematic plan view showing an example of a plan-view structure of one pixel of an active matrix substrate 6 in a liquid crystal display panel of Example 2. FIG. 5B is a schematic sectional view showing an example of a sectional structure along the line F-F in FIG. 5A. FIG. 5C is a schematic sectional view showing an example of a sectional structure along the line G-G in FIG. 5A.

FIGS. 5B and 5C also show the liquid crystal layer LC (liquid crystal materials) and the opposed substrate 7 which are present on the active matrix substrate 6.

In Example 2, an IPS-mode liquid crystal display panel will be described as an example of the liquid crystal display panel 1 according to the present invention. Moreover, in Example 2, the case where one pixel of the liquid crystal display panel 1 and the peripheral region thereof have a configuration as shown in FIGS. 5A to 5C, for example, will be described.

The active matrix substrate 6 is provided with the common electrodes CT, common lines CL, and scanning signal lines GL, and a first insulating layer 602 covering the common electrodes CT, common lines CL, and scanning signal lines GL, which are formed on a surface of an insulating substrate such as a glass substrate 601.

On the first insulating layer 602, a semiconductor layer 603 of the TFT element Tr, the video signal lines DL, source electrodes 607, and a second insulating layer 604 covering the video signal lines DL and source electrodes 607 are formed. In this case, a portion of each of the video signal lines DL and a portion of each of the source electrodes 607 are formed so as to ride over the semiconductor layer 603, and the portions riding over the semiconductor layer 603 function as the drain and source electrodes of the TFT element Tr, respectively.

In the liquid crystal display panel 1 of Example 2, the third insulating layer 605 is not formed, and pixel electrodes PX are formed on the second insulating layer 604. The pixel electrodes PX are connected to the source electrodes 607 through a contact hole CH (through-hole) that penetrates through the second insulating layer 604.

In this case, the common electrodes CT formed on the surface of the glass substrate 601 are formed in a plate-shape in a region (opening region) surrounded by two adjacent scanning signal lines GL and two adjacent video signal lines DL. On the plate shape common electrodes CT, the pixel electrodes PX having plural slits (four slits in FIG. 5A) are stacked. Moreover, in this case, the common electrodes CT of pixels arranged in a line along the extending direction of the scanning signal lines GL are connected by the common lines CL and shared.

Meanwhile, the opposed substrate 7 of the liquid crystal display panel 1 of Example 2 have the same configuration as the opposed substrate 7 of the liquid crystal display panel 1 of Example 1. Therefore, detailed description of the configuration of the opposed substrate 7 will be omitted.

When the active matrix substrate 6 of the liquid crystal display panel 1 of Example 2 is formed, first the common electrodes CT, the scanning signal lines GL, and the common lines CL are formed on the surface of the glass substrate 601. The common electrodes CT are formed, for example, by etching an ITO film which is deposited to a thickness of about 0.05 µm. The scanning signal lines GL and the common lines CL are formed, for example, by etching a chrome film which is deposited to a thickness of about 0.4 µm.

When the common electrodes CT, the scanning signal lines GL, and the common lines CL are formed by the above-described procedures, it is desirable to form a conductive layer 608 so as to be interposed between the glass substrate 601 and the scanning signal lines GL together with the common electrodes CT at the time of etching the ITO film. However, the conductive layer 608 may not be formed if the thickness of the common electrodes CT is sufficiently smaller than the thickness of the scanning signal lines GL as described above.

FIGS. 5B and 5C show the sectional structure when the common electrodes CT are formed by etching an ITO film, and thereafter, the scanning signal lines GL and common lines CL are formed by depositing and etching a chrome film. However, the forming of the common electrodes CT, the scanning signal lines GL, and the common lines CL is not limited to this. For example, the ITO and chrome films may be successively deposited and etched to form the common electrodes CT and the conductive layer 608, and thereafter, only the chrome film may be etched to form the scanning signal lines GL and the common lines CL.

Subsequently, the first insulating layer 602 is formed. The first insulating layer 602 is formed, for example, by depositing a silicon nitride film having a thickness of about 0.2 µm. In this case, the first insulating layer 602 is generally formed by a deposition method such as a CVD method. Therefore, on the surface of the first insulating layer 602, steps (irregularities) reflecting the plan-view shapes and thicknesses of the scanning signal lines GL, common electrodes CT, and common lines CL are formed.

Subsequently, the semiconductor layer 603 of the TFT element Tr, the video signal lines DL, and the source electrodes 607 are formed. The procedure of forming the semiconductor layer 603, the video signal lines DL, and the source electrodes 607 may be the same as the procedure of forming the semiconductor layer 603, the video signal lines DL, and the pixel electrodes PX as described in Example 1. That is, after forming an island-shaped semiconductor layer in which first and second amorphous silicon layers are stacked, the video signal lines DL and the source electrodes 607 are formed by depositing and etching a chrome film, and the semiconductor layer 603 is formed subsequently by etching the second amorphous silicon layer of the island-shaped semiconductor layer.

Subsequently, the second insulating layer 604 is formed. The second insulating layer 604 is formed, for example, by depositing a silicon nitride film having a thickness of about 0.3 µm. In this case, the second insulating layer 604 is generally formed by a deposition method such as a CVD method. Therefore, on the surface of the second insulating layer 604, the irregularities on the surface of the first insulating layer 602 and steps (irregularities) reflecting the plan-view shapes and thicknesses of the semiconductor layer 603, the video signal lines DL, and the source electrodes 607 are formed. In this case, on the second insulating layer 604, depressions (concavities) are formed between the scanning signal lines GL and the common lines CL (common electrodes CT) along the extending direction of the scanning signal lines GL.

Subsequently, a contact hole is formed on a predetermined region of the source electrodes 607 so as to penetrate through the second insulating layer 604.

Subsequently, the pixel electrodes PX are formed. The pixel electrodes PX are formed, for example, by depositing and etching an ITO film having a thickness of about 0.05 µm. In this case, the pixel electrodes PX are formed to have plural slits in a plan-view shape thereof.

The step of forming the opposed substrate 7 of the liquid crystal display panel 1 of Example 2 is the same as the procedure of the related art, and description thereof will be omitted.

The step of attaching the active matrix substrate 6 and the opposed substrate 7 formed by the above-described procedures and filling liquid crystal materials therebetween involves, for example, applying a ring-shaped sealing agent 8 to the peripheral portion of the display area DA of the opposed substrate 7, dropping liquid crystal materials to a region surrounded by the sealing agent 8, and attaching the active matrix substrate 6 to the opposed substrate 7.

The liquid crystal materials of the liquid crystal layer LC of this example were prepared by mixing nematic liquid crystals JC1041XX and nematic liquid crystals 5CB and ENDF (available from Seimi Chemical Corporation) with a mixture ratio of 30/30/40 (mol %) and adding a binaphthyl derivative represented by Chemical Formula 1 as a chiral dopant to the mixture. In this case, the binaphthyl derivative was added to different concentrations to form four kinds of liquid crystal materials A1, B1, C1, and D1. The concentrations of the binaphthyl derivatives calculated and added so that the Bragg diffraction wavelengths became 420 nm, 385 nm, 345 nm, and 325 nm were 2.4 mol % for liquid crystal materials A1, 2.7 mol % for liquid crystal materials B1, 3.0 mol % for liquid crystal materials C1, and 3.1 mol % for liquid crystal materials D1, respectively. Thereafter, a monomer mixture having a concentration of 6.3 mol % was prepared by mixing, as a crosslinking agent, 2-ethylhexyl acrylate (EHA) (available from Aldrich Corporation) and RM257 (available from Merck Corporation) with a mixture ratio of 7:3 to the liquid crystal materials. Moreover, 10 wt % of 2,2-dimethoxyphenylacetophenone (DMPAP) (available from Aldrich Corporation) to the weight of the monomer mixture was added as a photo-polymerization initiator and heated to be distributed uniformly.

Polymer-stabilized blue-phase liquid crystals were formed by irradiating the liquid crystal mixture with ultraviolet light (365 nm) at an irradiation intensity of 1.8 mWcm$^{-2}$ while maintaining the temperature of the panel to be constant over the temperature range where the liquid crystal mixture exhibits the blue phase. In this case, the active matrix substrate 6 and the opposed substrate 7 were attached so that the thickness (cell gap) of the liquid crystal layer LC became approximately the same as the height of the pillar-shaped spacers 10, for example, 25 μm. By increasing the thickness of the liquid crystal layer LC, a panel was produced which was rarely influenced by retardation.

Figure 6:
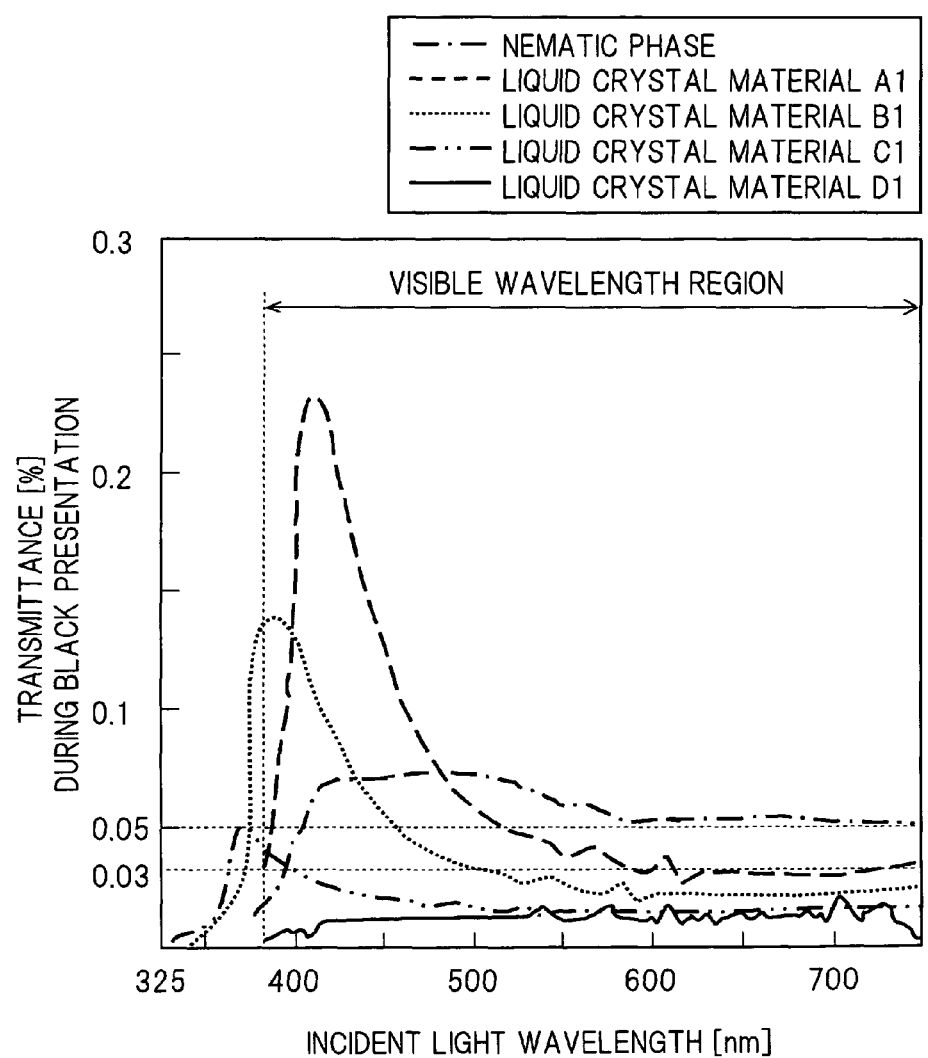
FIG. 6 schematically shows the transmittance spectrum and the wavelength of incident light during black presentation of a unit cell.

The present inventors measured the transmittance under the crossed Nicol state on the liquid crystal layer LC of each of the four liquid crystal displays in which the four kinds of liquid crystal materials A1, B1, C1, and D1 of Example 2 were filled, and the measurement results are shown in FIG. 6.

The transmittance during black presentation of the liquid crystal layer LC shown in FIG. 6 was measured using a spectroradiometer SR-3L1 (available from Topcon Corporation) in a state where a black image was presented on the entire display area DA. In measurement of the transmittance during the black presentation of the liquid crystal layer LC, the transmittance of a liquid crystal display panel having two polarizers arranged in the crossed Nicol state, the transmittance solely of the opposed substrate 7 having a color filter, and the transmittance solely of the active matrix substrate 6 were examined. A luminance under the crossed Nicol state of only the polarizers 9a and 9b that do not interpose a liquid crystal display panel therebetween (that is, a luminance corresponding to a transmittance of 0%) was used as a background luminance. A luminance of a light source (backlight) to the liquid crystal display panel (that is, a luminance corresponding to a transmittance of 100%) was used as a reference luminance. When measuring the transmittance of the liquid crystal layer LC, first, a transmittance $T_{LCD}$ of the liquid crystal display panel was measured. Thereafter, the color filter substrate was removed, and a transmittance $T_{CF}$ of the opposed substrate 7 and a transmittance $T_{TFT}$ of the active matrix substrate 6 were measured in a state where the polarizers were not present. The background luminance in the state without the polarizers was used as the luminance of the luminometer, and the reference luminance was used as the luminance of the light source. Since the panel transmittance $T_{LCD}$ can be calculated from the product of the transmittances of respective members and the light leakage ratios of the respective members, the transmittance T of the liquid crystal layer can be calculated by measuring these values. In this case, the transmittance T of the liquid crystal layer LC was calculated while taking the light leakage ratio of the liquid crystal layer LC into consideration. For comparison, FIG. 6 also shows the measurement results of the nematic-phase liquid crystals of the related art which are aligned in parallel. As described above, the transmittance during black presentation shown in FIG. 6 is calculated by subtracting the transmittances of the opposed substrate 7 and the active matrix substrate 6 from the transmittance of the liquid crystal display panel during the black presentation.

As understood from FIG. 6, the Bragg diffraction wavelengths of the liquid crystal materials A1 and B1 were approximately 420 nm and 385 nm, respectively, as expected. It can be understood that the liquid crystal materials A1 and B1 had higher light transmittances than the liquid crystal materials C1 and D1 in the visible wavelength region (380 nm or higher and 750 nm or lower) due to the influence of their Bragg diffraction peaks. However, it was confirmed that the liquid crystal materials C1 and D1 had far lower transmittances than the nematic-phase liquid crystals in the visible wavelength region and provided good black presentation. It was not possible to observe the Bragg diffraction peaks from the two transmittance measurement results because the peaks overlap with the absorption peaks of the liquid crystals. However, since the Bragg diffraction wavelengths were obtained as calculated for the liquid crystal materials A1 and B1, it can be considered that the Bragg diffraction wavelengths were obtained as calculated. The influence of the spectrum distribution was observed at around 400 nm from the liquid crystal materials C1 and the transmittance was as low as 0.05% or lower. Furthermore, in the wavelength region of 400 nm or higher and 750 nm or lower, the transmittance of the liquid crystal materials C1 and D1 was 0.05% or less, or more specifically 0.03% or less. And, in the wavelength region of 400 nm or higher and 750 nm or lower, the difference between the maximum and minimum of the transmittance of the liquid crystal materials C1 and D1 was as extremely low as 0.03% or lower, and good black presentation was obtained.

In Example 2, although the IPS-mode liquid crystal display panel 1 having such a pixel configuration as shown in FIGS. 5A to 5C was used, the pixel configuration, for example, the plan-view shapes (plan-view layout) of the TFT elements, pixel electrodes, and common electrodes, is not limited to this but may be appropriately changed. Moreover, an alignment film or the like may be formed on the surfaces of the active matrix substrate 6 and the opposed substrate 7 disposed close to the liquid crystal layer LC.

EXAMPLE 3

In this example, liquid crystal display panel 1 of Example 2 was manufactured using a liquid crystal mixture obtained by mixing liquid crystal materials JC1041XX and liquid crystal materials 5CB and T15 (available from Merck Corporation) with a mixture ratio of 50/40/10 (mol %) as the liquid crystals of the liquid crystal layer LC. And, the liquid crystal displays of this example, three kinds of liquid crystal materials in which the binaphthyl derivative was added to different concentrations similarly to Example 1 were used. In this example, the liquid crystal displays were manufactured similarly to Example 2 except for the above-mentioned matters.

The present inventors measured the transmittance under the crossed Nicol state similarly to Example 2 using a unit cell made from glass made up of the above-mentioned liquid crystal materials and found that the unit cell showed an extremely low transmittance as low as 0.05% or lower. Moreover, the stability at room temperature was evaluated, and the evaluation results showed that there was no precipitation of the chiral dopant, the monomer, the polymerization initiator, and the materials of the liquid crystal layer LC such as JC1041XX, 5CB, and T15 which are liquid crystal compositions.

EXAMPLE 4

In Example 4, liquid crystal displays were manufactured similarly to Example 1 except that a liquid crystal mixture in which 4.0 mol % of a binaphthyl derivative and 0.5 mol % of R811 (available from Merck Corporation) were added as the chiral dopant contained in the liquid crystal layer LC was used in the liquid crystal display panel 1 of Example 1. The two kinds of chiral dopants exhibit opposite helical twisting.

The present inventors measured the transmittance during black presentation under the crossed Nicol state similarly to Example 2 using a unit cell made from glass made up of the above-mentioned liquid crystal materials and found that the unit cell showed an extremely low transmittance during black presentation as low as 0.05% or lower in the wavelength region of 400 nm or higher and 750 nm or lower. Moreover, the stability at room temperature was evaluated, and the evaluation results showed that there was no precipitation of the chiral dopant, the monomer, the polymerization initiator, and the materials of the liquid crystal layer LC such as JC1041XX and 5CB which are liquid crystal compositions.

By using the chiral dopants exhibiting opposite helical twisting, it was possible to provide the blue-phase liquid crystal display panel 1 having improved phase stability.

EXAMPLE 5

In Example 5, liquid crystal displays were manufactured similarly to Example 1 except that a liquid crystal mixture in which 3.0 mol % of a binaphthyl derivative as represented by Chemical Formula 2 below and 2.0 mol % of S811 were added as the chiral dopant contained in the liquid crystal layer LC was used in the liquid crystal display panel 1 of Example 1. The product [HTP]·s of the binaphthyl derivative represented by Chemical Formula 2 is 28 ($\mu m^{-1}$).

[Chemical Formula 2]

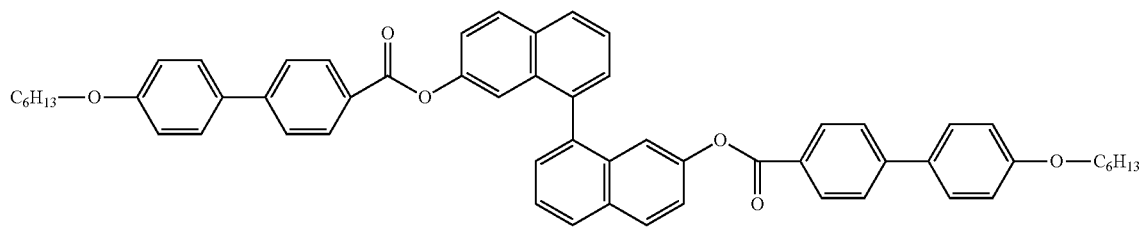

(2)

The present inventors measured the transmittance during black presentation under the crossed Nicol state similarly to Example 2 using a unit cell made from glass made up of the above-mentioned liquid crystal materials and found that the unit cell showed an extremely low transmittance as low as 0.03% or lower in the wavelength region of 400 nm or higher and 750 nm or lower. Moreover, the stability at room temperature was evaluated, and the evaluation results showed that there was no precipitation of the chiral dopant, the monomer, the polymerization initiator, and the materials of the liquid crystal layer LC such as JC1041XX and 5CB which are liquid crystal compositions.

By using a liquid crystal mixture in which other chiral dopants were added to the binaphthyl derivative represented by Chemical Formula 2 of which one kind thereof is a chiral dopant capable of decreasing the transmittance during black presentation, it was possible to provide the blue-phase liquid crystal display panel 1 which has small temperature dependence and higher phase stability because no one component is dominantly excessive.

EXAMPLE 6

In Example 6, ZLI4572, BDH1281, and S811 (which are available from Merck Corporation) were used as the chiral dopant contained in the liquid crystal layer LC of the liquid crystal display panel 1 of Example 1. The products $[HTP]_i \cdot s_i$ of the respective chiral dopants are 2.6 ($\mu m^{-1}$), 1.9 ($\mu m^{-1}$), and 4.8 ($\mu m^{-1}$), respectively, and it is difficult to decrease the transmittance during black presentation using one kind of chiral dopant. The respective chiral dopants were added to concentrations equal to or smaller than the saturation solubility $s_i$ of the respective chiral dopants. In Example 6, liquid crystal displays were manufactured similarly to Example 1 except that a mixture of plural chiral dopants was used, and specifically, 3.0 mol % of ZLI4572, 1.4 mol % of BDH1281, and 30 mol % of S811 were mixed. The liquid crystal materials using the chiral dopant mixture satisfied a relation of $[HTP] \cdot c \geq 5.5$ ($\mu m^{-1}$).

The present inventors measured the transmittance during black presentation under the crossed Nicol state similarly to Example 2 using a unit cell made from glass made up of the above-mentioned liquid crystal materials and found that the unit cell showed an extremely low transmittance as low as 0.05% or lower. Moreover, the stability at room temperature was evaluated, and the evaluation results showed that there was no precipitation of the chiral dopant, the monomer, the polymerization initiator, and the materials of the liquid crystal layer LC such as JC1041XX and 5CB which are liquid crystal compositions.

In a system in which it is not possible to realize the stable blue-phase liquid crystal display panel 1 having a low transmittance under the crossed Nicol state with one component thereof, it was confirmed that by using plural chiral dopants, it was possible to decrease the transmittance under the crossed Nicol state. Moreover, it was possible to provide the stable blue-phase liquid crystal display panel 1 having small temperature dependence.

COMPARATIVE EXAMPLE 1

In this comparative example, liquid crystal displays were manufactured similarly to Example 1 except that liquid crystal materials D and E in which the amounts of the added binaphthyl derivatives which are the chiral dopants added to the liquid crystals in the liquid crystal materials of the liquid crystal layer LC were 2.0 mol % and 2.2 mol % were used in the liquid crystal display panel 1 of Example 1. The products of the helical twisting power and the solubility were 4.6 ($\mu m^{-1}$) and 5.1 ($\mu m^{-1}$), respectively, for the liquid crystal materials D and E.

The present inventors evaluated the contrast ratio of the liquid crystal display having the liquid crystal display panel 1 of Comparative Example 1 in a manner similar to Example 1. The evaluation results showed that the contrast ratio was 2000 or lower similarly to the nematic liquid crystals, and it was not possible to improve the contrast ratio.

COMPARATIVE EXAMPLE 2

In this comparative example, liquid crystal displays were manufactured similarly to Example 1 except that 5.0 mol % of ZLI4572 was added as the chiral dopant added to the liquid crystals in the liquid crystal materials of the liquid crystal layer LC of the liquid crystal display panel 1 of Example 1. It was confirmed that the product of the helical twisting power and the concentration of the ZLI4572 added to the JC1041XX and 5CB was 3.9 ($\mu m^{-1}$) and was larger than the product of the helical twisting power and the solubility which was 2.6 ($\mu m^{-1}$).

The present inventors evaluated the stability at room temperature for the liquid crystal display having the liquid crystal display panel 1 of Comparative Example 2, and the evaluation results showed that the chiral dopant was precipitated.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display comprising:
    a pair of substrates including at least one transparent substrate;
    a liquid crystal layer disposed between the pair of substrates; and
    an electrode group formed on at least one of the pair of substrates so as to apply an electric field to the liquid crystal layer,
    wherein the liquid crystal layer contains at least one kind of liquid crystalline compound and a mixture of n kinds (n is a natural number of 2 or more) of chiral dopants, one of the n kinds of chiral dopants is a binaphthyl derivative comprising naphthyl groups acyclically joined,
    wherein a concentration c of the mixture of n kinds of chiral dopants is lower than a saturation solubility s of the mixture of n kinds of chiral dopants,
    wherein the concentration c of the mixture of n kinds of chiral dopants and a helical twisting power [HTP] of the mixture of n kinds of chiral dopants satisfy a relation of $[HTP] \cdot c \geq 5.5$ ($\mu m^{-1}$), and
    wherein the binaphthyl derivative is selected from a group consisting of

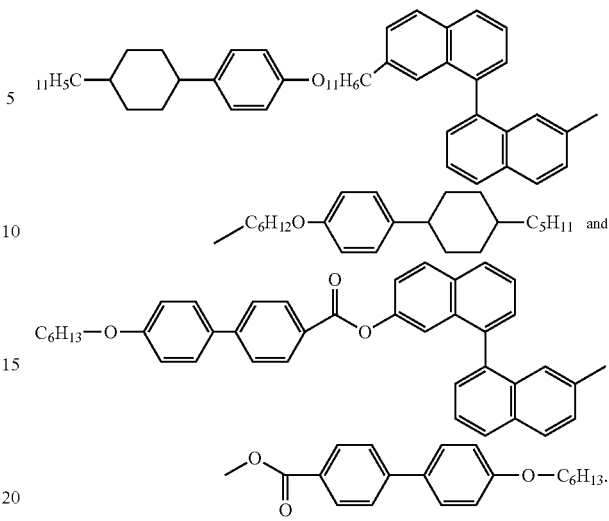

2. The liquid crystal display according to claim 1,
    wherein a contrast ratio is 2000 or higher, and
    wherein when the liquid crystal layer has a Bragg diffraction wavelength, the longest wavelength of the Bragg diffraction wavelength is 380 nm or less.
3. The liquid crystal display according to claim 1,
    wherein a contrast ratio is 2000 or higher, and
    wherein when the liquid crystal layer has a Bragg diffraction wavelength, the longest wavelength of the Bragg diffraction wavelength is 345 nm or less.
4. The liquid crystal display according to claim 1,
    wherein the liquid crystal layer contains a polymerizable monomer, and
    wherein the liquid crystal layer has such a content ratio that a molar fraction of the polymerizable monomer is smaller than that of the liquid crystalline compound.
5. The liquid crystal display according to claim 1,
    wherein a chiral pitch of the chiral nematic phase of the liquid crystal layer is 180 nm or smaller.
6. The liquid crystal display according to claim 1,
    wherein a chiral pitch of the chiral nematic phase of the liquid crystal layer is 160 nm or smaller.
7. The liquid crystal display according to claim 1,
    wherein the concentration c of the mixture of n kinds of chiral dopants and the helical twisting power [HTP] of the mixture of n kinds of chiral dopants satisfy a relation of $[HTP] \cdot c \geq 6.0$ ($\mu m^{-1}$).
8. The liquid crystal display according to claim 1,
    wherein a concentration $c_i$ (i is a natural number of 1 to n) of each of the n kinds of chiral dopants is lower than a saturation solubility $s_i$ of each of the n kinds of chiral dopants.
9. The liquid crystal display according to claim 1,
    wherein a concentration $c_i$ (i is a natural number of 1 to n) of each of the n kinds of chiral dopants among the n kinds of chiral dopants and a helical twisting power $[HTP]_i$ of each of the n kinds of chiral dopants satisfy a relation of $[HTP]_i \cdot c_i < 5.5$ ($\mu m^{-1}$).
10. The liquid crystal display according to claim 1,
    wherein the n kinds of chiral dopants contains 2 kinds of chiral dopants of which the twisted directions are the same.

11. The liquid crystal display according to claim 1,
wherein a transmittance during black presentation of the liquid crystal layer under a crossed Nicol state is 0.05% or lower in a wavelength region of 400 nm or higher and 750 nm or lower.

12. The liquid crystal display according to claim 1,
wherein a transmittance during black presentation of the liquid crystal layer under a crossed Nicol state is 0.03% or lower in a wavelength region of 400 nm or higher and 750 nm or lower.

13. The liquid crystal display according to claim 1,
wherein one of the two kinds of chiral dopants of which the twisted directions are opposite each other is a binaphthyl derivative.

14. The liquid crystal display according to claim 1, wherein the n kinds of chiral dopants contain two kinds of chiral dopants of which the twisted directions are opposite each other, and
wherein a concentration of c of the mixture of n kinds of chiral dopants is expressed as a molar fraction.

\* \* \* \* \*